United States Patent
Islam et al.

(10) Patent No.: US 11,425,720 B2
(45) Date of Patent: Aug. 23, 2022

(54) SYSTEM AND METHOD FOR TRANSMITTING BEAM FAILURE RECOVERY REQUEST

(71) Applicant: QUALCOMM incorporated, San Diego, CA (US)

(72) Inventors: Muhammad Nazmul Islam, Littleton, MA (US); Sundar Subramanian, San Diego, CA (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/004,920

(22) Filed: Aug. 27, 2020

(65) Prior Publication Data
US 2020/0404640 A1    Dec. 24, 2020

Related U.S. Application Data

(62) Division of application No. 16/002,876, filed on Jun. 7, 2018, now Pat. No. 10,813,097.
(Continued)

(51) Int. Cl.
*H04W 72/04* (2009.01)
*H04L 5/00* (2006.01)
(Continued)

(52) U.S. Cl.
CPC ........ *H04W 72/046* (2013.01); *H04B 7/0695* (2013.01); *H04L 1/00* (2013.01);
(Continued)

(58) Field of Classification Search
CPC .............. H04W 72/046; H04W 16/28; H04W 74/0833; H04W 74/004; H04W 76/19;
(Continued)

(56) References Cited

U.S. PATENT DOCUMENTS

2010/0272035 A1   10/2010   Park et al.
2015/0078335 A1   3/2015   Sivanesan et al.
(Continued)

FOREIGN PATENT DOCUMENTS

| WO | 2013044970 A1 | 4/2013 |
| WO | 2017024516 A1 | 2/2017 |
| WO | 2017178697 A1 | 10/2017 |

OTHER PUBLICATIONS

Anonymous: "5G System Level Aspects of Operations in Higher Frequencies Regimes—5G Book", May 28, 2017 (May 28, 2017), 3 Pages, XP055506971, Retrieved from the Internet: URL: https://5gbook.org/2017/05/18/5g-system-level-aspects-of-operations-in-higher-frequencies-regimes/ [retrieved on Sep. 13, 2018].
(Continued)

*Primary Examiner* — Thai Nguyen
(74) *Attorney, Agent, or Firm* — Loza & Loza, LLP

(57) ABSTRACT

A user equipment (UE) can transmit a beam failure recovery request using contention-based physical random access channel (PRACH) resources to supplement and/or replace non-contention-based resources for transmitting the beam failure recovery request. The UE can reduce beam recovery latency by informing its intention for beam failure recovery by transmitting a beam failure recovery request during the random access channel (RACH) procedure. The base station may dedicate a set of RACH resources that can be used for both transmitting regular contention-based RACH messages and beam failure recovery request.

25 Claims, 15 Drawing Sheets

Related U.S. Application Data

(60) Provisional application No. 62/567,062, filed on Oct. 2, 2017, provisional application No. 62/519,769, filed on Jun. 14, 2017.

(51) Int. Cl.
*H04L 1/00* (2006.01)
*H04L 5/14* (2006.01)
*H04B 7/06* (2006.01)
*H04W 16/28* (2009.01)
*H04W 74/08* (2009.01)
*H04W 74/00* (2009.01)

(52) U.S. Cl.
CPC .......... *H04L 5/0048* (2013.01); *H04L 5/0053* (2013.01); *H04L 5/1469* (2013.01); *H04W 16/28* (2013.01); *H04W 74/0833* (2013.01); *H04W 74/004* (2013.01)

(58) Field of Classification Search
CPC . H04W 74/008; H04B 7/0695; H04B 7/0408; H04B 7/0602; H04L 1/00; H04L 5/0048; H04L 5/0053; H04L 5/1469
See application file for complete search history.

(56) References Cited

U.S. PATENT DOCUMENTS

| | | |
|---|---|---|
| 2017/0332407 A1 | 11/2017 | Islam et al. |
| 2017/0346539 A1 | 11/2017 | Islam et al. |
| 2018/0227899 A1 | 8/2018 | Yu et al. |
| 2018/0279262 A1 | 9/2018 | Babaei et al. |
| 2018/0317264 A1* | 11/2018 | Agiwal ................. H04W 52/50 |
| 2018/0368126 A1 | 12/2018 | Islam et al. |
| 2019/0320355 A1 | 10/2019 | Da Silva |
| 2020/0344723 A1* | 10/2020 | Babaei ................. H04W 72/14 |

OTHER PUBLICATIONS

CHTTL: "Discussion on Beam Failure Recovery", 3GPP Draft; R1-1708380, 3rd Generation Partnership Project (3GPP), Mobile Competence Centre ; 650, Route Des Lucioles; F-06921 Sophia-Antipolis Cedex; France, vol. RAN WG1, No. Hangzhou; May 15, 2017-May 19, 2017, May 14, 2017 (May 14, 2017), 5 Pages, XP051273573, Retrieved from the Internet: URL: http://www.3gpp.org/ftp/Meetings_3GPP_SYNC/RAN1/Docs/ [retrieved on May 14, 2017].
Huawei, et al., "Link Recovery Procedure for Beam Failure", 3GPP Draft; R1-1704230, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Mar. 25, 2017 (Mar. 25, 2017), 7 Pages, XP051251039, Retrieved from the Internet: URL: http://www.3gpp.org/ftp/tsg_ran/WG1_RL1/TSGR1_88b/Docs/ [retrieved on Mar. 25, 2017].
Huawei, et al., "RACH Procedures and Resource Configuration", 3GPP Draft; R1-1706976, 3rd Generation Partnership Project (3GPP), Mobile Competence Centre ; 650, Route Des Lucioles; F-06921 Sophia-Antipolis Cedex; France, vol. RAN WG1, No. Hangzhou, China; May 15, 2017-May 19, 2017, May 14, 2017 (May 14, 2017), pp. 1-7, XP051272206, Retrieved from the Internet: URL: http://www.3gpp.org/ftp/Meetings_3GPP_SYNC/RAN1/Docs/ [retrieved on May 14, 2017].
International Search Report and Written Opinion—PCT/US2018/036763—ISA/EPO—dated Sep. 24, 2018.
Mediatek Inc: "RLM/RLF and Beam Failure Recovery", 3GPP Draft; R2-1704532, 3rd Generation Partnership Project (3GPP), Mobile Competence Centre; 650, Route Des Lucioles; F-06921 Sophia-Antipolis Cedex ; France, vol. RAN WG2, No. Hangzhou, China; May 15, 2017-May 19, 2017, May 14, 2017 (May 14, 2017), 7 Pages, XP051275091, Retrieved from the Internet: URL: http://www.3gpp.org/ftp/Meetings_3GPP SYNC/RAN2/Docs/ [retrieved on May 14, 2017].
Qualcomm Incorporated: "Beam Management", 3GPP Draft; R2-1703564 Beam-Management, 3rd Generation Partnership Project (3GPP), Mobile Competence Centre; 659, Route Des Lucioles; F-06921 Sophia-Antipolis Cedex; France, vol. RAN WG2, No. Spokane, USA; Apr. 3, 2017-Apr. 7, 2017, Mar. 25, 2017 (Mar. 25, 2017), pp. 1-4, XP051254501, Retrieved from the Internet: URL: http://www.3gpp.org/ftp/tsg_ran/WG2_RL2/TSGR2_97bis/Docs/ [retrieved on Mar. 25, 2017] the whole document.
Qualcomm Incorporated: "Beam Recovery Procedure", 3GPP Draft; R2-1703561 Beam-Recovery-Procedure, 3rd Generation Partnership Project (3GPP), Mobile Competence Centre; 650, Route des Lucioles; F-06921 Sophia-Antipolis Cedex; France, vol. RAN WG2, No. Spokane, USA; Apr. 3, 2017-Apr. 7, 2017, Apr. 3, 2017 (Apr. 3, 2017), pp. 1-4, XP051245400, Retrieved from the Internet: URL: http://www.3gpp.org/ftp/Meetings_3GPP_SYNC/RAN2/Docs/ [retrieved on Apr. 3, 2017] the whole document.
Qualcomm Incorporated: "Beam Recovery Request", 3GPP Draft; R2-1703562 Beam-Recovery-Request, 3rd Generation Partnership Project (3GPP), Mobile Competence Centre; 650, Route Des Lucioles; F-06921 Sophia-Antipolis Cedex; France, vol. RAN WG2, No. Spokane, USA; Apr. 3, 2017-Apr. 7, 2017, Mar. 25, 2017 (Mar. 25, 2017), pp. 1-3, XP051254499, Retrieved from the Internet: URL: http://www.3gpp.org/ftp/tsg_ran/WG2_RL2/TSGR2_97bis/Docs/ [retrieved on Mar. 25, 2017] the whole document.
Qualcomm Incorporated: "Considerations of RLM and RLF in NR", 3GPP Draft; R2-1703563 RLM-RLF in NR, 3rd Generation Partnership Project (3GPP), Mobile Competence Centre; 650, Route Des Lucioles; F-06921 Sophia-Antipolis Cedex; France, vol. RAN WG2, No. Spokane, USA; Apr. 3, 2017-Apr. 7, 2017, Mar. 25, 2017 (Mar. 25, 2017), pp. 1-4, XP051254500, Retrieved from the Internet: URL: -http://www.3gpp.org/ftp/tsg_ran/WG2_RL2/TSGR2_97bis/Docs/ [retrieved on Mar. 25, 2017] the whole document.
Samsung: NR Beam Recovery Procedure , 3GPP Draft; R2-1703712 NR Beam Recovery Procedure, 3rd Generation Partnership Project (3GPP), Mobile Competence Centre; 650, Route Des Lucioles; F-06921 Sophia-Antipolis Cedex; France vol. RAN WG2, No. Spokane, USA; Apr. 3, 2017-Apr. 7, 2017, Apr. 3, 2017 (Apr. 3, 2017), 6 Pages, XP051245520, Retrieved from the Internet: URL: http://www.3gpp.org/ftp/Meetings_3GPP_SYNC/RAN2/Docs/ [retrieved on Apr. 3, 2017].
Taiwan Search Report—TW107119793—TIPO—dated Dec. 1, 2021.
Supplementary European Search Report—EP20205959—Search Authority—Munich—dated Feb. 3, 2021.
CATT: "Discussion on DL Beam Recovery [online]", 3GPP TSG RAN WG1 #89, R1-1707477, Internet: URL: http://www.3gpp.org/ftp/tsg_ran/WG1_RL1/TSGR1_89/Docs/R1-1707477.zip. May 19, 2017, 5 Pages.
Qualcomm Incorporated: "Beam Recovery Procedures", R1-1702606, 3GPP TSG-RAN WG1 #88, Feb. 13-17, 2017, Athens, Greece, Internet: URL: http://www.3gpp.org/ftp/tsg_ran/WG1_RL1/TSGR1_88/Docs/R1-1702606.zip. 8 Pages.
ZTE: "4-step Random Access Procedure [online]", 3GPP TSG RAN WG1 #89, R1-1707049, Internet: URL: http://www.3gpp.org/ftp/tsg_ran/WG1_RL1/TSGR1_89/Docs/R1-1707049.zip. May 19, 2017, 15 Pages.

* cited by examiner

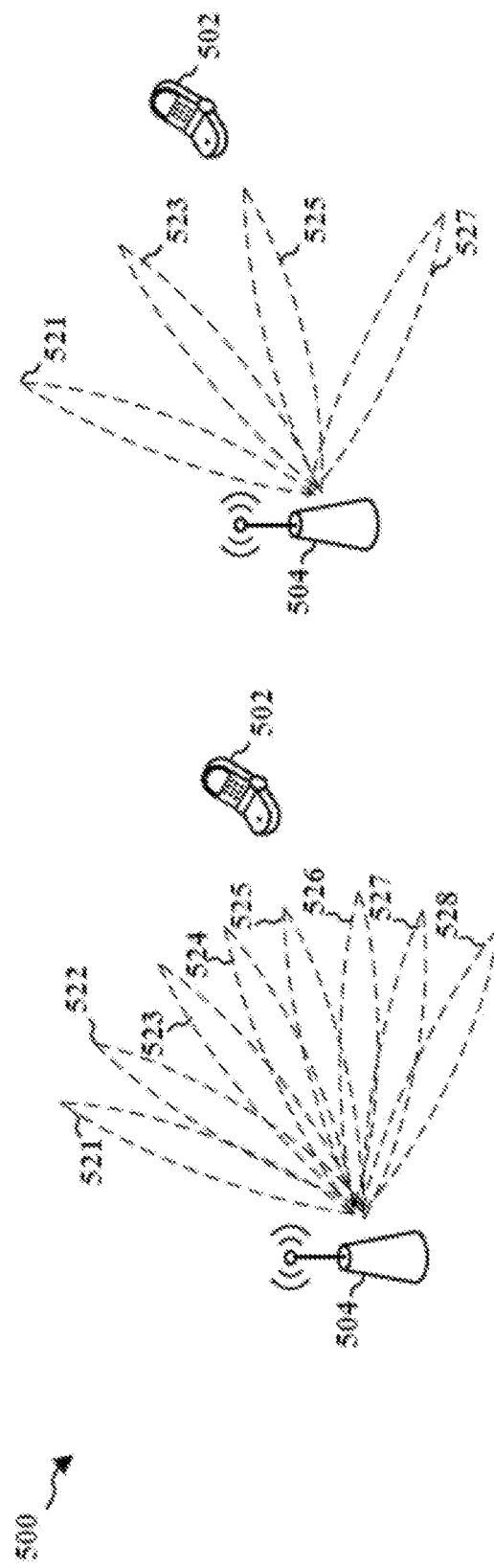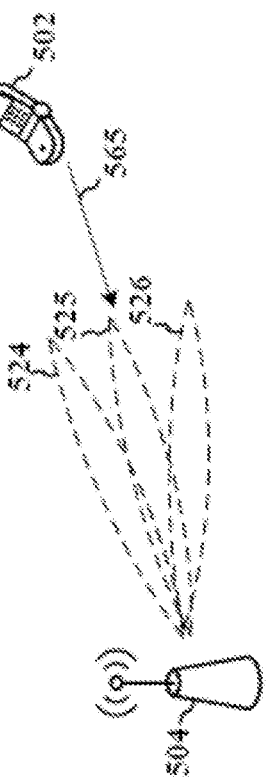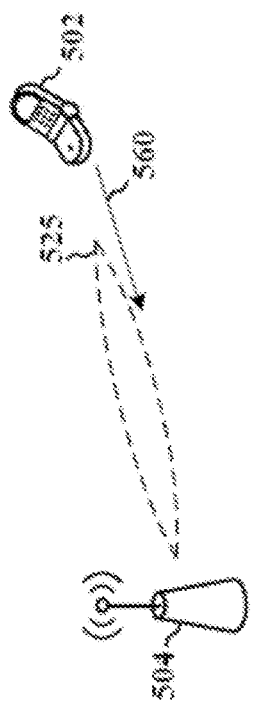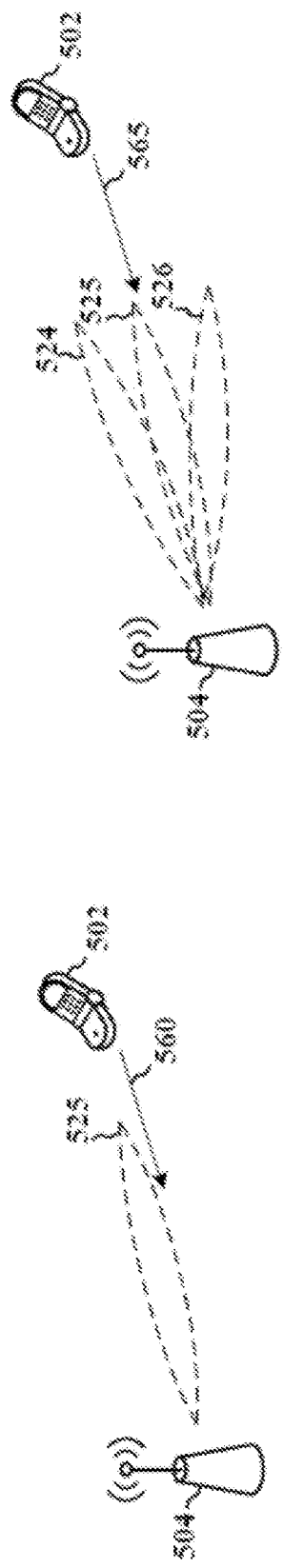
FIG. 5A
FIG. 5B
FIG. 5C
FIG. 5D

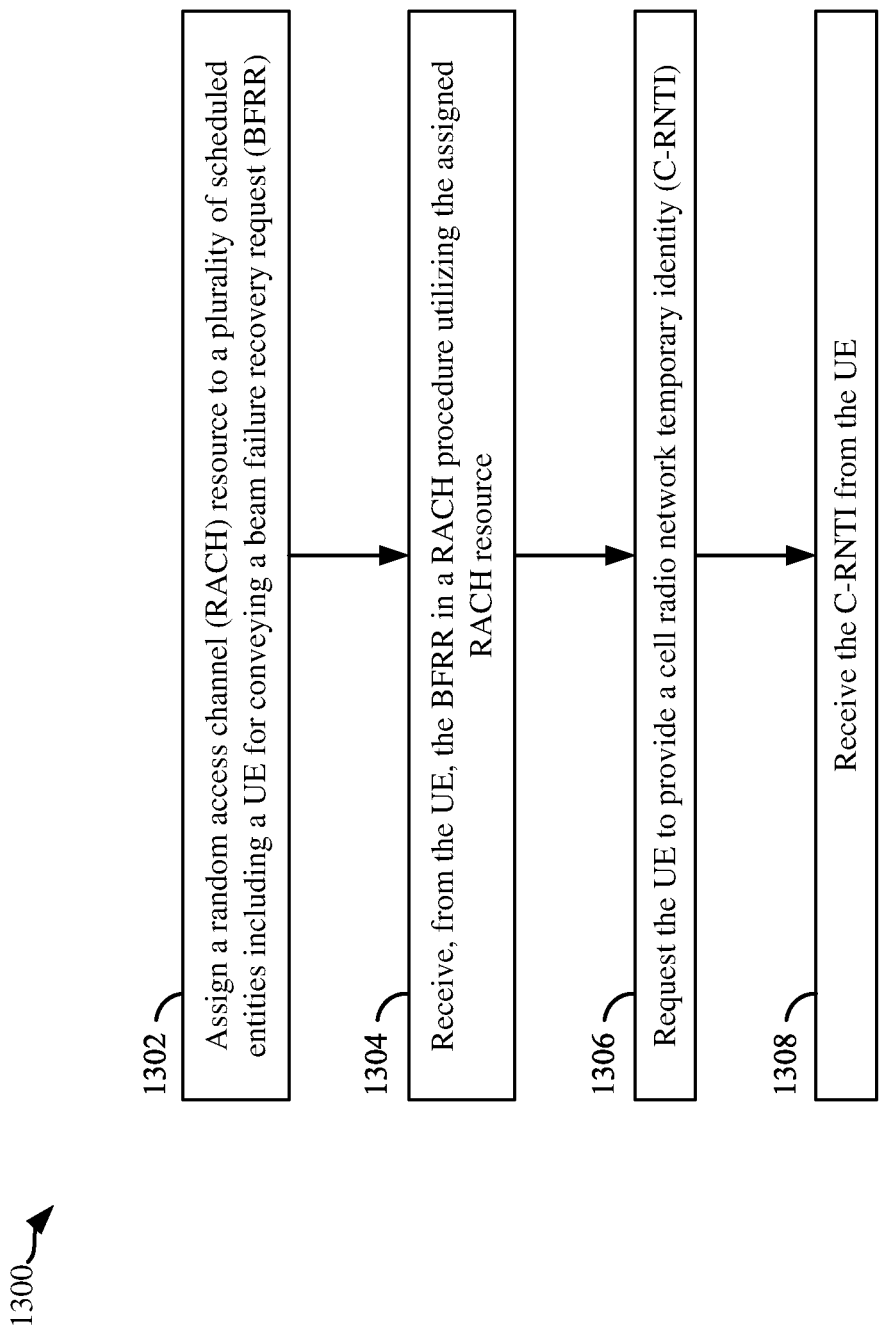

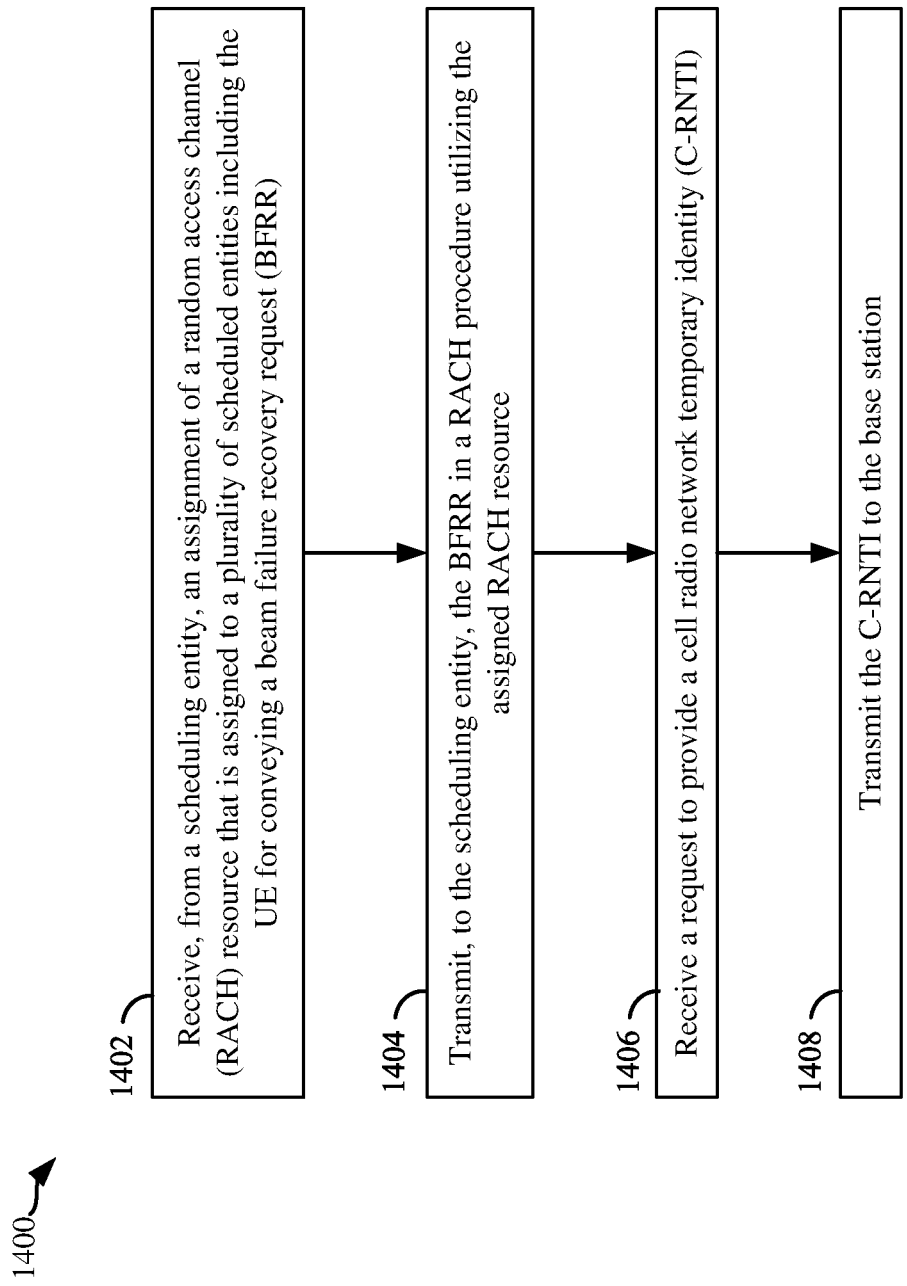

SYSTEM AND METHOD FOR TRANSMITTING BEAM FAILURE RECOVERY REQUEST

PRIORITY CLAIM

This application is a divisional application of U.S. patent application Ser. No. 16/002,876, filed Jun. 7, 2018, which claims priority to and the benefit of U.S. provisional patent application No. 62/519,769 filed on Jun. 14, 2017, and U.S. provisional patent application No. 62/567,062 filed on Oct. 2, 2017, the entire contents of which are incorporated herein by reference as if fully set forth below in their entirety and for all applicable purposes.

TECHNICAL FIELD

The technology discussed below relates generally to wireless communication systems, and more particularly, to beamformed communication and a beam failure recovery process.

INTRODUCTION

Next generation wireless networks, for example 5G New Radio (NR), may use millimeter wave (mmW) communication between a base station and a user equipment (UE). Radio waves with wavelengths between 1 millimeter and 10 millimeters may be referred to as millimeter waves. Near mmW may extend down to a frequency of about 3 GHz with a wavelength of 100 millimeters. Wireless communication using an mmW or near mmW radio frequency band generally has higher path loss and a shorter range than those of lower frequencies.

In 5G NR, the base station and UE may use beamforming techniques to compensate for the high path loss and short range of mmW communication. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference. The constructive interference may create one or more beams of signals. As the demand for mobile broadband access continues to increase, research and development continue to advance communication using beamforming techniques to mitigate the high path loss and short range of mmW and near mmW wireless communication.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects of the disclosure, a user equipment (UE) may communicate with a base station using beamforming techniques. When the UE experiences a beam failure, the UE may transmit a beam failure recovery request (BFRR) using contention-based physical random access channel (PRACH) resources to supplement and/or replace non-contention-based resources for transmitting the BFRR. The UE may reduce beam recovery latency by conveying its intention for beam failure recovery during a random access channel (RACH) procedure. To that end, the base station may dedicate or allocate a set of resources that may be used for transmitting regular contention-based RACH messages and beam failure recovery requests. In some examples, during the RACH procedure, the base station may inquire about the UE's intention for performing the RACH procedure, and the UE may indicate that the RACH procedure may be performed for the purpose of transmitting a BFRR. In some aspects of the present disclosure, the same contention-based RACH resource may be assigned or allocated to multiple UEs for transmitting a BFRR.

One aspect of the disclosure provides a method of wireless communications at a user equipment (UE). The UE determines a beam failure of a current beam with a scheduling entity. The UE transmits a random access channel (RACH) preamble in response to the determination of the beam failure. The UE receives a RACH response from the scheduling entity. The UE transmits a radio resource control (RRC) connection request to the scheduling entity, wherein the RRC connection request indicates that the RACH preamble includes a beam failure recovery request.

Another aspect of the disclosure provides a method of beam failure recovery operable at a scheduling entity. The scheduling entity receives a random access channel (RACH) preamble in a RACH procedure from a user equipment (UE). The scheduling entity transmits a RACH response to the UE. The scheduling entity receives a radio resource control (RRC) connection request from the UE, wherein the RRC connection request indicates that the RACH preamble includes a beam failure recovery request.

Another aspect of the disclosure provides an apparatus for wireless communication. The apparatus includes a communication interface configured to communicate with a scheduling entity, a memory stored with executable code, and a processor operatively coupled to the communication interface and the memory. The processor is configured by the executable code to perform various functions. The processor determines a beam failure of a current beam with the scheduling entity. The processor transmits a random access channel (RACH) preamble in response to the determination of the beam failure. The processor receives a RACH response from the scheduling entity. The processor transmits a radio resource control (RRC) connection request to the scheduling entity, wherein the RRC connection request indicates that the RACH preamble includes a beam failure recovery request.

Another aspect of the disclosure provides a method of beam failure recovery operable at a scheduling entity. The scheduling entity assigns a random access channel (RACH) resource to a plurality of scheduled entities including a user equipment (UE) for conveying a beam failure recovery request (BFRR). The scheduling entity receives, from the UE, the BFRR in a RACH procedure utilizing the assigned RACH resource.

Another aspect of the disclosure provides a method of beam failure recovery operable at a user equipment (UE). The UE receives, from a scheduling entity, an assignment of a random access channel (RACH) resource that is assigned to a plurality of scheduled entities including the UE for conveying a beam failure recovery request (BFRR). The UE transmits, to the scheduling entity, the BFRR in a RACH procedure utilizing the assigned RACH resource.

Another aspect of the disclosure provides an apparatus for wireless communication. The apparatus includes a communication interface configured to communicate with a user equipment (UE), a memory, and a processor operatively coupled to the communication interface and the memory. The processor and the memory are configured to perform various functions. The processor assigns a random access channel (RACH) resource to a plurality of scheduled entities including a user equipment (UE) for conveying a beam failure recovery request (BFRR). The processor receives, from the UE, the BFRR in a RACH procedure utilizing the assigned RACH resource. The processor also receives, in the RACH procedure, a cell radio network temporary identity (C-RNTI) from the UE, and confirm the C-RNTI received from the UE corresponds to a C-RNTI stored in the apparatus.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

FIGS. 5A-5G illustrate examples of communication between a base station and a user equipment (UE) using beamforming techniques according to some aspects of the disclosure.

FIG. 13 is a flow chart illustrating a beam failure recovery process operable at a scheduling entity according to some aspects of the disclosure.

FIG. 14 a flow chart illustrating a beam failure recovery process operable at a UE according to some aspects of the disclosure.

DETAILED DESCRIPTION

Figure 1:
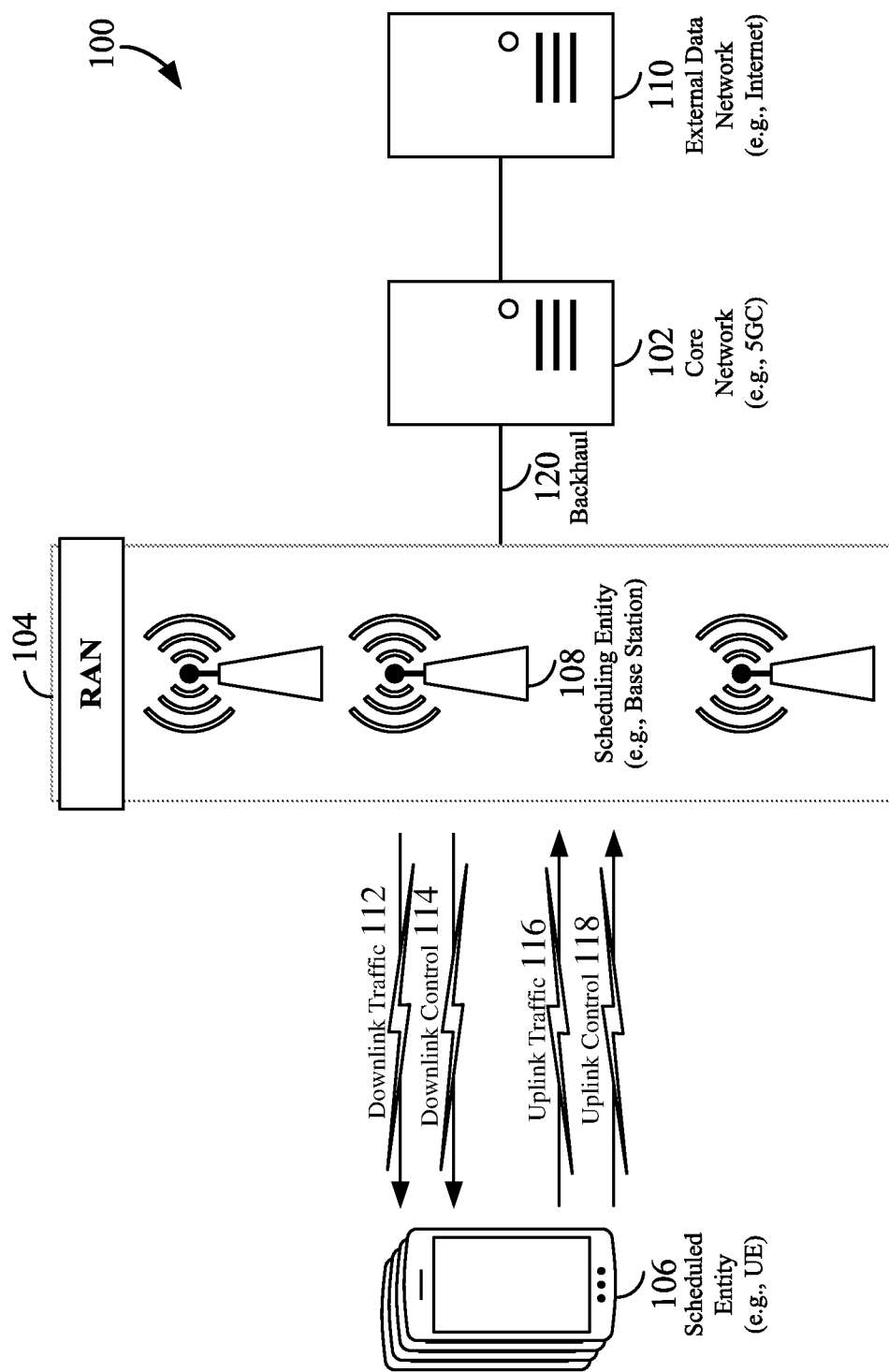
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

In wireless communication systems using millimeter wave (mmW) or near mmW, path loss may be very high and range may be limited in some scenarios. Generally, an mmW band refers to frequency bands above 24 GHz, which provides a large bandwidth relative to lower frequencies.

Beamforming is a technique that may be used to direct or concentrate wireless signals to the desired direction to form one or more beams to mitigate path loss and/or extend communication range. In beamformed signal transmission, the amplitude and phase of signal transmitted from each antenna in an antenna array may be controlled (e.g., precoded, weighted) to create a predetermined (e.g., directional) pattern of constructive and destructive interference in the wavefront. Therefore, a signal beam (referred to as "beam") may provide more energy or range in a certain direction to the receiver.

To facilitate beamformed transmission, a transmitter (e.g., base station) may transmit one or more beam reference signals by sweeping in all or some predetermined directions so that a user equipment (UE) may identify or select one or more best/better "coarse" beam based on the beam reference signals. For example, the UE may select a coarse beam based on the received power and/or signal quality of the beam reference signals. Furthermore, the base station may transmit a beam refinement request signal based on the selected coarse beam so that the UE may track "fine" beams. When a "coarse" beam identified by the UE changes, the UE may inform the base station so that the base station may train one or more new "fine" beams for the UE. In some examples, when the UE can no longer "see" or loses the current beam, this condition is referred to as a beam failure. The UE may determine that a beam failure condition exists when the signal quality and/or strength of the current/selected beam is below a predetermined threshold or not detected at all. In a beam failure recovery process, the UE may transmit a beam failure recovery request (BFRR) to the base station. The BFRR may indicate a new beam (e.g., best "coarse" beam) detected by the UE from a set of beams that are periodically transmitted by the base station. Then, the base station and UE may use the new beam to replace the current beam to maintain beamformed communication.

In various aspects of the disclosure, the UE may transmit a BFRR using wireless communication resources (e.g., time-frequency resources) dedicated or allocated to the new beam and/or BFRR. In some examples, the resources may include non-contention-based and contention-based physical random access channel (PRACH) resources. In some examples, the UE may inform the base station of its intention to transmit a BFRR using a random access channel (RACH) procedure such that the latency associated with beam recovery may be reduced.

Definitions

NR: new radio. Generally refers to 5G technologies and the new radio access technology undergoing definition and standardization by 3GPP in Release 15.

mmWave: millimeter-wave. Generally refers to high bands above 24 GHz, which can provide a very large bandwidth.

Beamforming: directional signal transmission or reception. For a beamformed transmission, the amplitude and phase of each antenna in an array of antennas may be precoded, or controlled to create a desired (e.g., directional) pattern of constructive and destructive interference in the wavefront.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

1. In single-user MIMO, the transmitter sends one or more streams to the same receiver, taking advantage of capacity gains associated with using multiple Tx, Rx antennas in rich scattering environments where channel variations can be tracked.

2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where a base station, in communication with a large number of UEs, can exploit multipath signal propagation to increase overall network capacity by increasing throughput and spectral efficiency, and reducing the required transmission energy.

1. The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
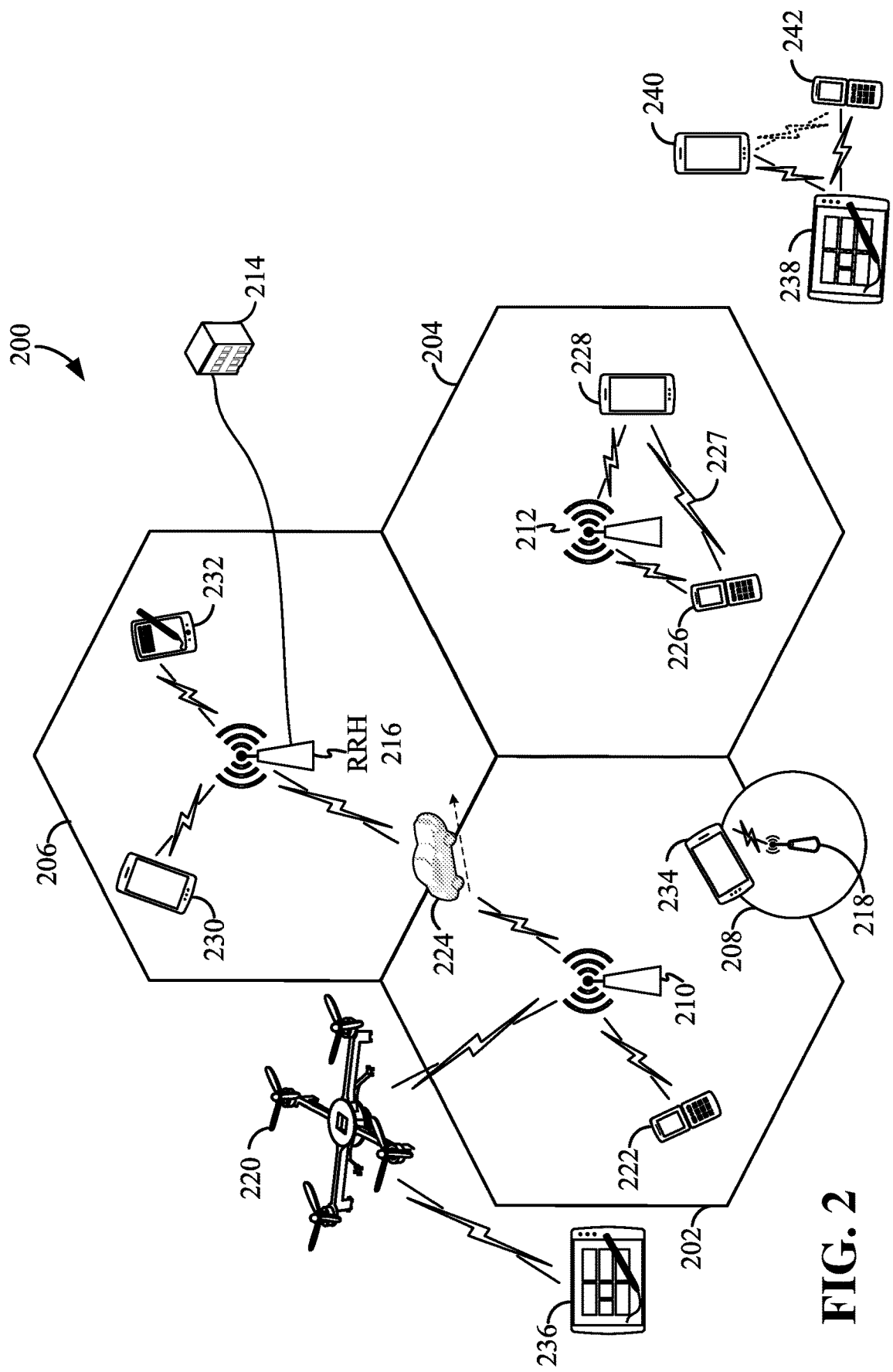
FIG. 2 is a conceptual illustration of an example of a radio access network.

FIG. 2 is a conceptual illustration of an example of a radio access network (RAN) 200. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
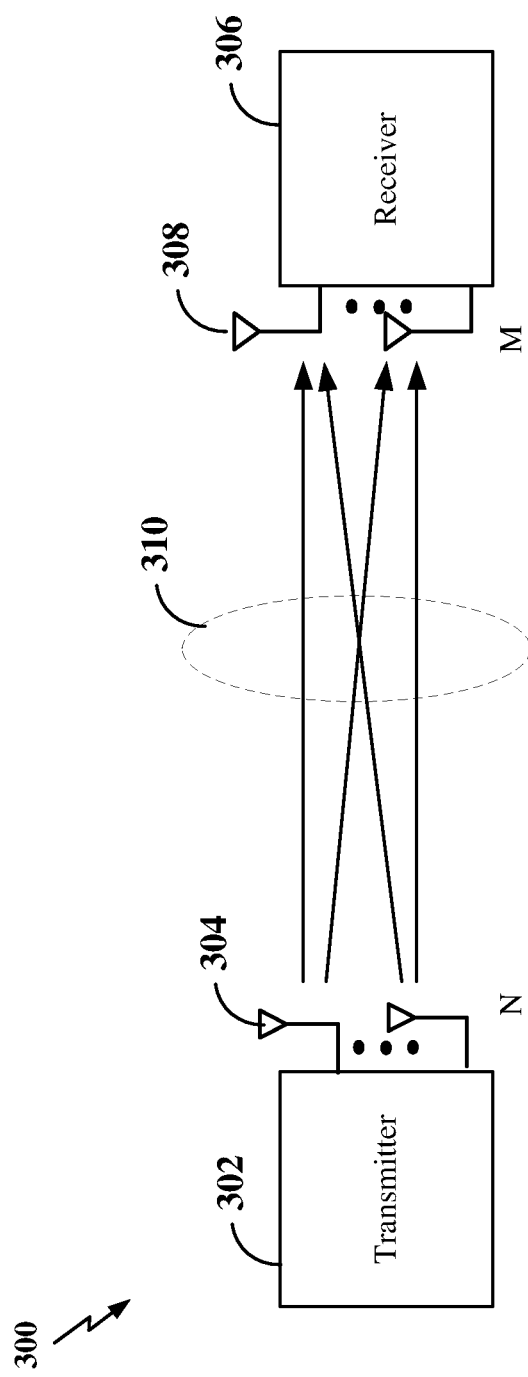
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition may be used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described hereinbelow. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., a duration of 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple numbers of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE. In some examples, the scheduling entity may allocate certain RBs to the UE for specific control traffic, e.g., random access control and beamforming control and communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe (e.g., 1 ms subframe 402) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
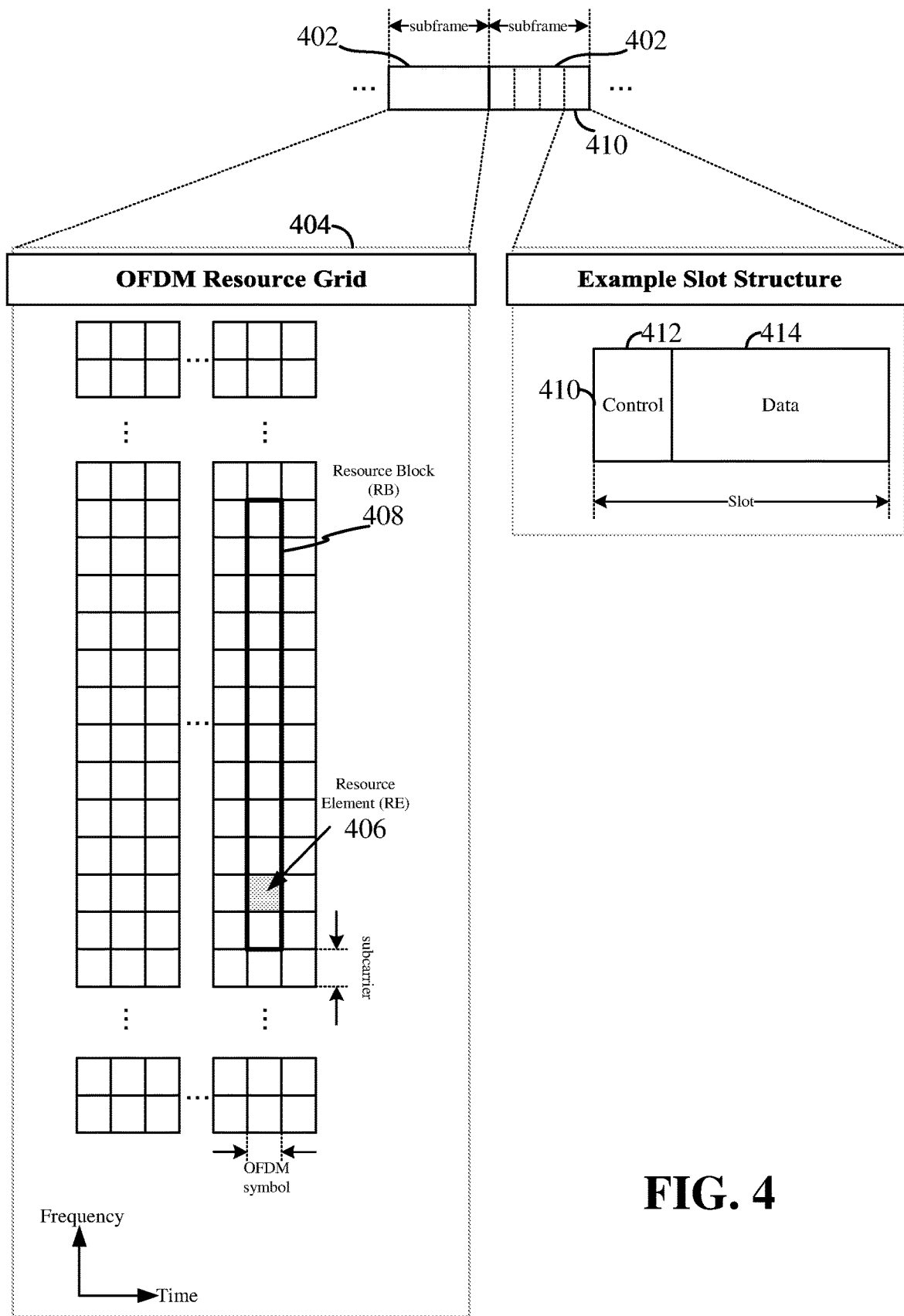
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

FIGS. 5A through 5G are diagrams illustrating communication between a base station (BS) 504 and a UE 502 using beamforming techniques according to some aspects of the disclosure. The base station 504 may be any of the base stations or scheduling entities illustrated in FIGS. 1, 2 and/or 3. The UE 502 may be any of the UEs or scheduled entities illustrated in FIGS. 1, 2, and/or 3. It should be noted that while some beams are illustrated as adjacent to one another in these figures, such an arrangement may be different in different examples. In some examples, beams transmitted during a same symbol or time slot may not be adjacent to one another. In some examples, the BS 504 may transmit more or fewer beams distributed in all or different directions (e.g., 360 degrees or less)

In one example, a beam set may contain a predetermined number of different beams FIG. 5A illustrates eight exemplary beams 521, 522, 523, 524, 525, 526, 527, and 528 in eight different directions. Each beam may be identified by a corresponding beam index. In some aspects of the disclosure, the BS 504 may be configured to transmit at least one of the beams 521, 522, 523, 524, 525, 526, 527, 528 toward the UE 502. For example, the BS 504 can sweep or transmit beams in eight directions using eight ports (e.g., antenna ports) during a synchronization slot. In some examples, the synchronization slot may be one of the slots 410 of FIG. 4. The BS 504 may transmit a beam reference signal (BRS) for each beam in the different beam directions during the synchronization slot, for example, in the control portion 412 of a slot 410. In some examples, the spatial distance between the beams may be the minimum distance that the BS is capable of. The receiver (e.g., UE 502) may use the BRS to identify or detect the beam by performing, for example, received power measurements on the BRS for each received beam.

In another example, referring to FIG. 5B, the BS 504 may transmit a first set of beams 521, 523, 525, 527 in four directions. For example, the BS 504 may transmit a BRS in a synchronization slot of each of the transmitted beams 521, 523, 525, 527. In one example, these beams 521, 523, 525, 527 transmitted in four directions may be odd-indexed beams for the four directions out of the possible eight directions for the beam set. For example, the BS 504 may be capable of transmitting beams 521, 523, 525, 527 in directions adjacent to other beams 522, 524, 526, 528 that the BS 504 is configured to transmit. In this example, this configuration in which the BS 504 transmits beams 521, 523, 525, 527 for the four directions may be considered a "coarse" beam set. In a coarse beam set, the spatial separation of the beams is greater than the minimum separation that the BS 504 is capable of. The BS can reduce signaling and/or processing overhead by transmitting the coarse beam set instead of all possible beams.

Referring to FIG. 5C, the UE 502 may determine or select a beam that is strongest or preferable (e.g., best signal quality) in the coarse beam set. For example, the UE 502 may determine that the beam 525 carrying a BRS is strongest or preferable. In some examples, the UE 502 may select a beam by measuring the received power and/or signal quality associated with each of the first set of coarse beams 521, 523, 525, 527; comparing the measurements to one another; and selecting the beam (e.g., beam index) that corresponds to the greatest, highest, or best measurement. The selected beam may be identified by a corresponding beam index known to the BS 504. The UE 502 may transmit an indication 560 including this beam index to the BS 504 in an uplink (UL) transmission. In one example, the indication 560 may include a request for the BS 504 to transmit a beam refinement reference signal (BRRS) or a channel state information reference signal (CSI-RS), the UE may select a refined beam based on the BRRS or CSI-RS. In some examples, the BRRS may be referred to by different terminology without departing from the present disclosure, such as a beam refinement signal, a beam tracking signal, or another term.

In various aspects of the disclosure, the UE 502 may determine resources (e.g., time, frequency, and/or preambles) that correspond or are assigned to the selected beam or beam index. The resources are used to facilitate communication using the corresponding beam. For example, the resources may include one of a radio frame, a subframe, a slot, a symbol, a subcarrier region, a preamble, a sequence, or an RE. Each resource may correspond to a value, for example, a radio frame index, a subframe index, slot index, a symbol index, or a subcarrier region. In one example, the UE 502 may have stored therein or may have access to a mapping table (e.g., a lookup table 960 of FIG. 9) that indicates respective resources (e.g., a value or index) to which the beam index corresponds. For example, the UE 502 may determine the beam index and then access a lookup table to determine a resource index or region that corresponds to the determined beam index.

In one example, the resources may be included in resources of the PUCCH. In one example, the resources may be included in resources of a slot associated with a random access channel (RACH) procedure. For example, the resources may be included in the bandwidth or carrier(s) reserved for RACH transmission. The BS 504 may receive an indication 560 that includes a request for beam tracking (e.g., a request for a BRRS). Based on the indication 560, the BS 504 may determine the index corresponding to the selected beam 525 used to receive the indication. In one example, the UE may transmit the indication 560 using a resource corresponding to the index of the selected beam 525. In one aspect of the disclosure, the BS 504 may have stored therein or may have access to a mapping table (e.g., a lookup table 830 of FIG. 8) that indicates a respective resource (e.g., a value or index) to which the beam index corresponds. For example, the BS 504 may determine the resource on which the indication 560 is received and then access a lookup table to determine a beam index (e.g., the index corresponding to the selected beam 525) or resource region that corresponds to the determined beam index. Therefore, the BS 504 can determine the beam index based on the resources used to receive the indication 560.

Referring to FIG. 5D, the BS 504 may transmit a second set of beams based on the index included in the indication 560. For example, the UE 502 may indicate that a first beam 525 is strongest or preferable and, in response, the BS 504 may transmit a second set of beams 524, 525, 526 to the UE 502 based on the indicated beam index. In an aspect of the disclosure, the second set of beams 524, 525, 526 transmitted based on the indicated beam index may be closer (e.g., spatially and/or directionally) to the selected beam 525 than those other beams 521, 523, 527 of the first set of beams (coarse beam set). The second set of beams 524, 525, 526 transmitted based on the indicated beam index may be considered a "fine" beam set or refinement beams. The separation between two adjacent beams in the fine beam set is smaller than that of the coarse beam set. In one example, a BRRS may be transmitted in each of the beams 524, 525, 526 of the fine beam set. In one example, the beams 524, 525, 526 of the fine beam set may be adjacent beams with minimum separation that the BS 504 is capable of.

Based on one or more BRRSs received in the beams 524, 525, 526 of the fine beam set, the UE 502 may transmit a second indication 565 to the BS 504 to indicate a best, preferred, or selected "fine" beam or refined beam. In one example, the second indication 565 may use two (2) or more bits (e.g., index value) to indicate the selected beam. For example, the UE 502 may transmit an indication 565 that indicates an index corresponding to the selected beam 525. The BS 504 may then transmit to the UE 502 using the selected beam 525 in subsequent beamformed communication.

Figure 5E:
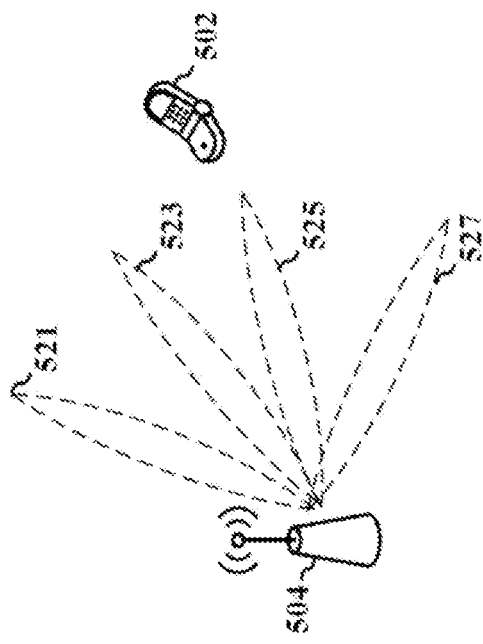

In another example, referring to FIG. 5E, the BS 504 may transmit a BRS in a plurality of directions during a synchronization slot. The BS 504 may transmit the BRS continuously or periodically, e.g., even after the UE 502 has communicated the second indication 565 of a selected beam 525 (e.g., fine beam) as described above in reference to FIG. 5D. For example, the BS 504 may transmit simultaneously or sweep beams 521, 523, 525, 527 (e.g., a "coarse" beam set) that each include a BRS. The BRS may be transmitted periodically or in a predetermined interval.

Figure 5G:
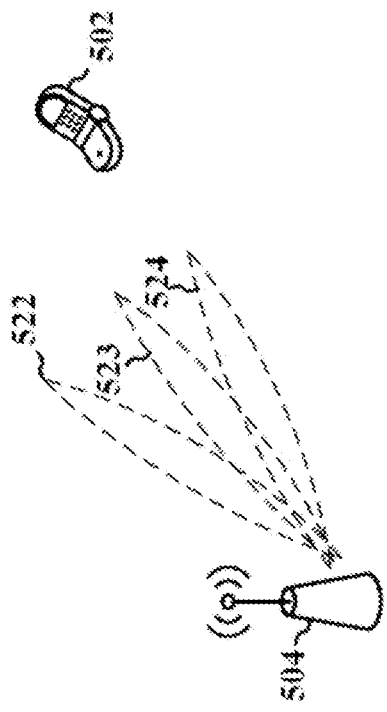
Figure 5F:
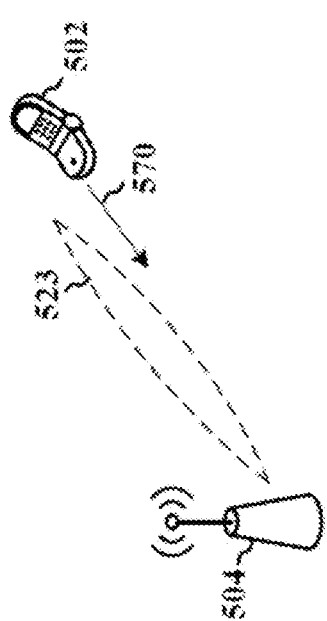

Referring to FIG. 5F, the quality of the selected beam 525 (see FIG. 5E) may deteriorate or fail due to various reasons (e.g., UE movement and/or interference) such that the UE 502 may no longer be able to see or communicate with the BS 504 using the selected beam 525. In that case, based on the BRS that is transmitted in the synchronization slot (e.g., continuously or periodically transmitted), the UE 502 may find a new beam 523 on which to communicate with the BS 504. For example, the UE 502 may determine that the beam 523 carrying a BRS is strongest, best, or preferable. The UE 502 may select a beam by measuring the received power and/or received quality associated with each of the set of coarse beams 521, 523, 525, 527, comparing the measurements of the beams to one another, and selecting the best or preferred beam. The selected beam may correspond to a beam index known to the BS 504. The UE 502 may transmit a request 570 indicating this beam index to the BS 504. In one example, the indication (request 570) may include a beam failure recovery request (BFRR).

In one aspect of the disclosure, the resources for transmitting the beam failure recovery request (e.g., request 570 of FIG. 5F) may be included in resources associated with the PRACH that may be used for a RACH procedure. In one example, the resources may be included in the bandwidth or subcarrier(s) reserved for RACH transmission. In one example, the resource for transmitting the beam failure recovery request (BFRR) may be a resource orthogonal to the resources allocated to the PRACH. In another example, the resource for transmitting the BFRR may be a contention-based RACH resource. In a contention-based RACH procedure, multiple UEs may select the same PRACH preamble in the same slot, and the BS performs a contention resolution process to resolve the conflict. In a non-contention based RACH procedure, the BS assigns different PRACH preambles to the UEs to avoid contention.

Still referring to FIG. 5F, after the BS 504 receives the request 570 (see FIG. 5F) with a BFRR from the UE 502, the BS 504 may determine a beam index based on at least one of the request and/or the resource carrying the request 570. The beam index may correspond to a beam among the set of beams illustrated in FIG. 5E. For example, the BS 504 may determine that the request 570 is carried on a resource corresponding to the index of the selected beam 523. In one example, the BS 504 may have stored therein or may have access to a mapping table (e.g., a lookup table 830) that indicates a respective resource (e.g., a value or index) corresponding to the beam index. For example, the BS 504 may determine the resource on which the request 570 is received and then access a lookup table to determine a beam index (e.g., the index corresponding to the selected beam 523) or resource region that corresponds to the determined beam index. In one example, an uplink beam during reception of the request 570 may be one of the first set of beams 521, 523, 525, 527.

In an aspect of the disclosure, referring to FIG. 5G, the BS 504 may transmit a second set of beams 522, 523, 524 based on at least one of the request 570 and/or the resource on which the request 570 is carried. In one example, the BS 504 may determine, from the request 570 and/or the at least one resource carrying the request 570, a range of indexes. In one example, the BS 504 determines the beam index based on at least one subcarrier of the at least one resource on which the request 570 is carried.

In one aspect of the disclosure, the BS 504 determines, from within the range of indexes, the beam index based on the strength and/or quality of a signal (e.g., reference signal) in different receive chains of the BS 504 through which the request 570 is received. For example, the BS 504 may receive the request 570 through a plurality of receive chains of the BS 504. The BS 504 may determine a signal strength of the request 570 for each receive chain through which the request 570 is received. The BS 504 may determine that each receive chain is associated with at least one beam index (e.g., the beam index for beam 523), and so the BS 504 may determine the beam index that corresponds to the receive chain in which the highest or strongest signal strength of the request 570 is detected.

In one aspect of the disclosure, the BS 504 may transmit, to the UE 502, an instruction to perform beam refinement. In one example, the instruction to perform beam refinement may be based on the selected beam 523 indicated to the BS 504 by the UE 502. In one example, the BS 504 may transmit one or more BRRSs in one or more synchronization slots of the second set of beams 522, 523, 524. The UE 502 may measure the BRRS in the scheduled slot(s) to determine the best beam of the BS 504, such as by measuring the received power and/or received quality of each beam of the second set of beams 522, 523, 524, and comparing the measured values to one another to determine the highest values corresponding to a strongest or best beam of the second set of beams 522, 523, 524.

While the above-described beam failure recovery processes are described with the UE transmitting the beam failure recovery request (BFRR), without departing from the scope of the present disclosure, similar processes may be used by the base station to transmit a beam failure recovery request.

Figure 6:
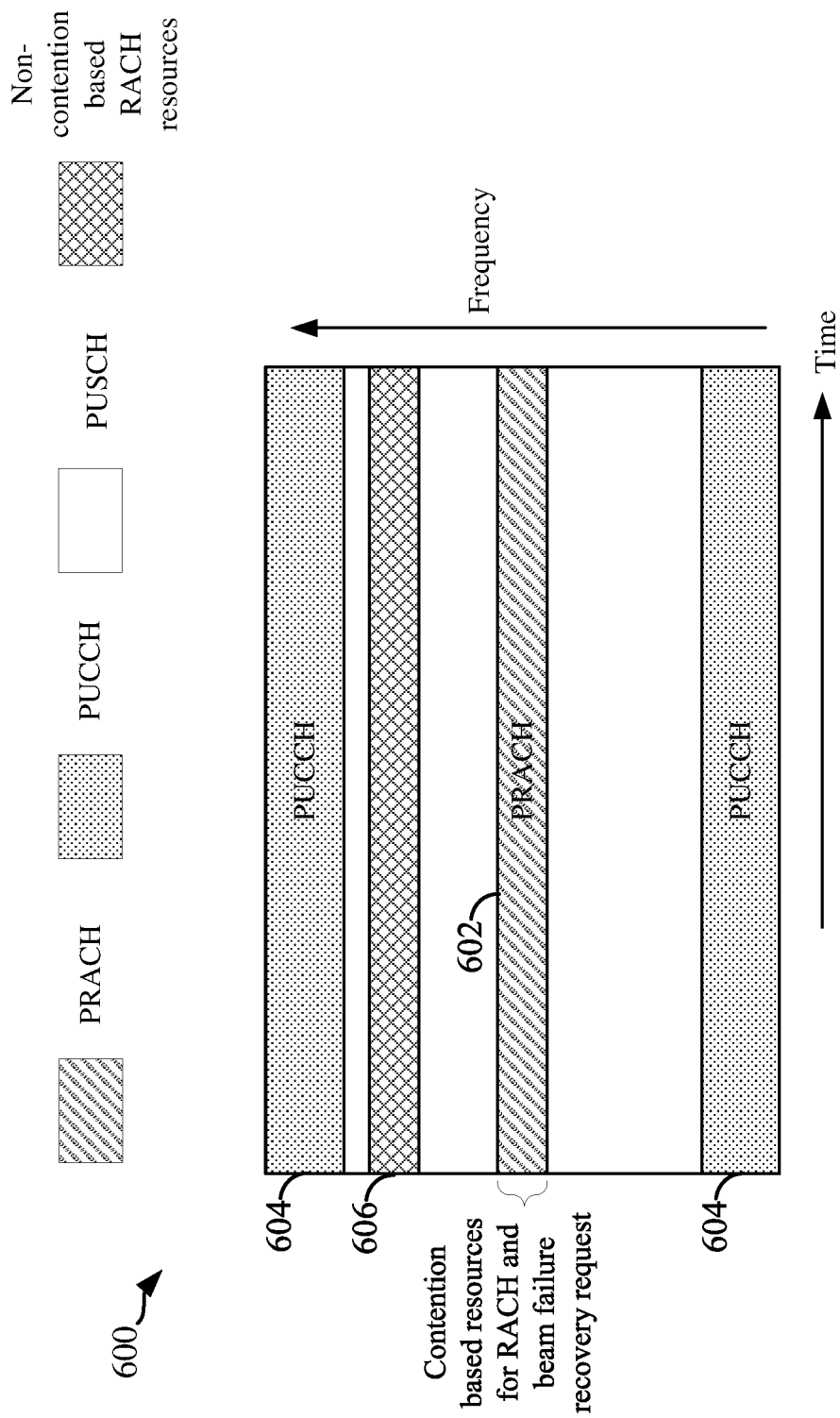
FIG. 6. is a diagram conceptually illustrating an exemplary resource allocation within an uplink (UL) slot according to some aspects of the disclosure.

FIG. 6. illustrates an exemplary resource allocation within an uplink (UL) slot 600 according to some aspects of the disclosure. In some examples, the UL slot 600 may correspond to a slot or subframe illustrated and described in relation to FIG. 4. FIG. 6 represents the sources (e.g., RBs 408) of the UL slot 600 in time and frequency domains. Time is represented in the horizontal direction, and frequency is represented in the vertical direction. A physical random access channel (PRACH) 602 may be within one or more slots based on a PRACH configuration. In some examples, the PRACH 602 may include consecutive resources (e.g., RBs) within one or more slots. A UE uses the PRACH to perform initial system access and achieve UL synchronization using an access procedure, for example, a RACH procedure. A physical uplink control channel (PUCCH) 604 may be located on, for example, the edges of the UL system bandwidth. The PUCCH 604 can carry uplink control information (UCI), for example, scheduling requests, a channel quality indicator (CQI), a precoding matrix indicator (PMI), a rank indicator (RI), and HARQ ACK/NACK feedback. The scheduling entity (e.g., base station, eNB, gNB) may also allocate certain resources of the UL slot 600 to a UL data channel (e.g., PUCCH) that carries user data, and may additionally carry a buffer status report (BSR), a power headroom report (PHR), and/or UCI.

In some aspects of the disclosure, the UE may transmit a beam failure recovery request (e.g., request 570 of FIG. 5F) on a channel 606 using non-contention-based RACH resources that are orthogonal (e.g., different carriers and/or sequences) to other RACH resources 602. In a RACH procedure, the UE transmits a random access preamble on the PRACH. In this example, the non-contention-based channel 606 uses subcarriers that are different from those of the contention-based PRACH 602. However, in system or network with a large number of devices, this non-contention-based approach may consume a lot of network resources.

Figure 7:
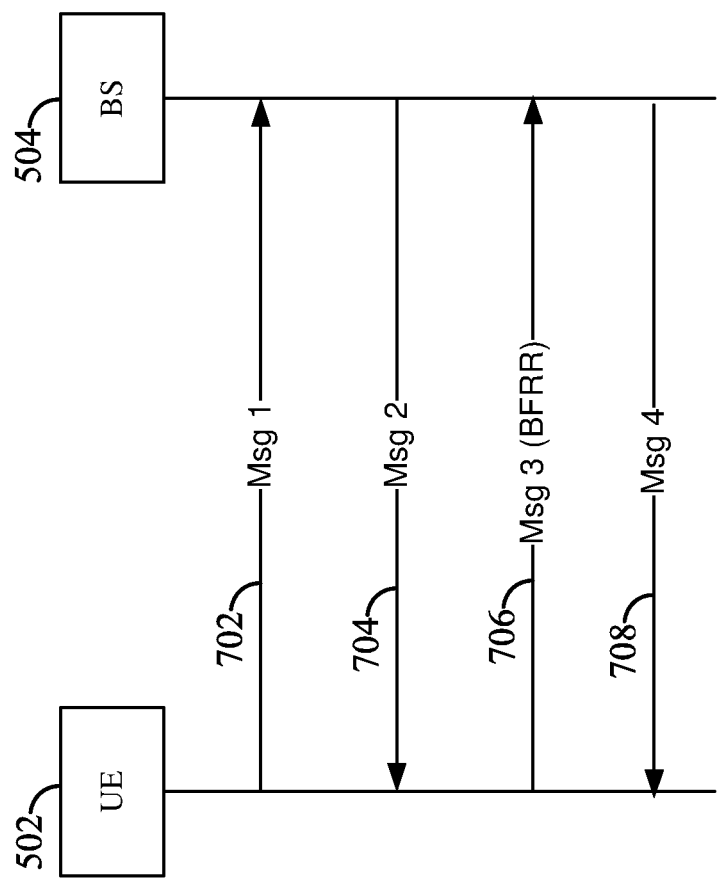
FIG. 7 is a diagram illustrating a random access channel (RACH) procedure according to some aspects of the disclosure.

In some aspects of the disclosure, the UE may use contention-based resources to supplement and/or replace the non-contention-based resources for transmitting a beam failure recovery request (BFRR) or scheduling request (SR). In a contention-based RACH procedure, referring to FIG. 7, the UE 502 may transmit (at 702) a RACH preamble (message 1) to the BS 504 using contention-based RACH resources. In response to the RACH preamble, the BS 504 transmits (at 704) a random access response (message 2) to the UE 502. The random access response may include information related to UL resources of the UE, such as a timing advance, a temporary cell radio network temporary identity (C-RNTI), a UL grant, etc. Then, the UE may transmit (at 706) an RRC connection request message (message 3) to the BS 504 based on the temporary C-RNTI. In some examples, the UE may indicate in the RRC connection request message that the RACH procedure is performed for the purpose of conveying a BFRR. At the end of the RACH procedure, the UE 502 may receive (at 708) an RRC connection setup message (message 4) from the BS 504. In this example, the UE 502 needs to complete the above-described 4-step contention-based RACH procedure before it can transmit a BFRR. Therefore, the BS 504 is not aware of UE's intention for beam recovery before the RACH procedure is completed. This approach increases the latency of beam failure recovery.

In some aspects of the disclosure, the UE may reduce beam recovery latency by informing the base station of its intention for beam failure recovery by communicating a BFRR to the base station using the RACH procedure. In some examples, the base station may dedicate or allocate a set of RACH resources that are used for transmitting both contention-based RACH messages (used for initial access, handover, paging response, etc.) and a BFRR. The set of resources dedicated to both contention-based RACH communication and beam failure recovery request may include all or a portion of all RACH resources (e.g., RACH resources 602). The resources can include time (e.g., slot), frequency (e.g., carriers or tones), and/or preambles.

Figure 8:
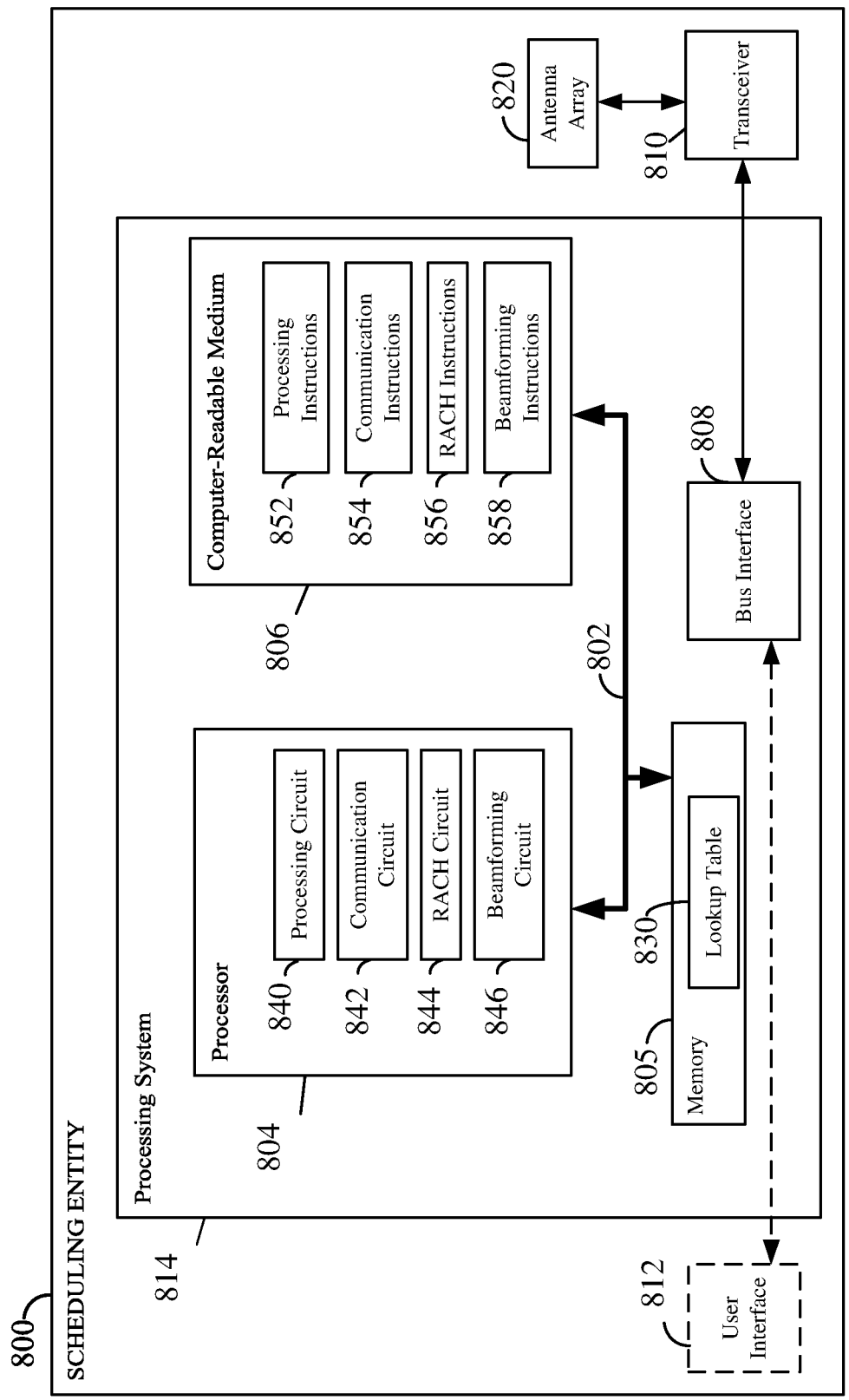
FIG. 8 is a block diagram illustrating an example of a hardware implementation for a scheduling entity employing a processing system according to some aspects of the disclosure.

FIG. 8 is a block diagram illustrating an example of a hardware implementation for a scheduling entity 800 employing a processing system 814. For example, the scheduling entity 800 may be a user equipment (UE) as illustrated in any one or more of FIGS. 1, 2, 3, 5A-5G, 7, and/or 12. In another example, the scheduling entity 800 may be a base station as illustrated in any one or more of FIGS. 1, 2, 3, 5A-5G, 7, and/or 12.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions and algorithm described herein. That is, the processor 804, as utilized in a scheduling entity 800, may be used to implement any one or more of the processes and procedures described below and illustrated in FIGS. 11-14.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include circuitry configured for various functions, including, for example, a processing circuit 840, a communication circuit 842, a RACH circuit 844, and a beamforming communication circuit 846. The processing circuit 840 may be configured to perform various data processing and logic functions. The communication circuit 842 may be configured to perform various UL and DL communication functions using the transceiver 810. UL communication functions may include various functions for receiving UL control and data from one or more scheduled entities. DL communication functions may include various functions for transmitting DL control and data to one or more scheduled entities. The RACH circuit 844 may be configured to perform contention-based and/or non-contention based RACH processes. The beamforming communication circuit 846 may be configured to perform various beamforming functions described throughout this disclosure. For example, the beamforming communication circuit 846 may be configured to use the transceiver 810 and an antenna array 820 for performing a beam failure recovery process during a RACH process using contention-based resources.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software. The scheduling entity may store a lookup table 830 including a plurality of beam indexes in the memory 805. Each beam index corresponds to a beam and its associated resources that may be used for beamforming communication.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include software configured for various functions, including, for example, processing instructions 852, communication instructions 854, RACH instructions 856, and beamforming communication instructions 858. The processing instructions 852 in cooperation with the processing circuit 840 may perform various data processing and logic functions. The communication instructions 854 in cooperation with the communication circuit 842 may perform various UL and DL communication functions using the transceiver 810. The RACH instructions 856 in cooperation with the RACH circuit 844 may perform contention-based and/or non-contention based RACH processes. The beamforming communication instructions 858 in cooperation with the beamforming communication circuit 846 may perform various beamforming functions described throughout this disclosure.

Figure 9:
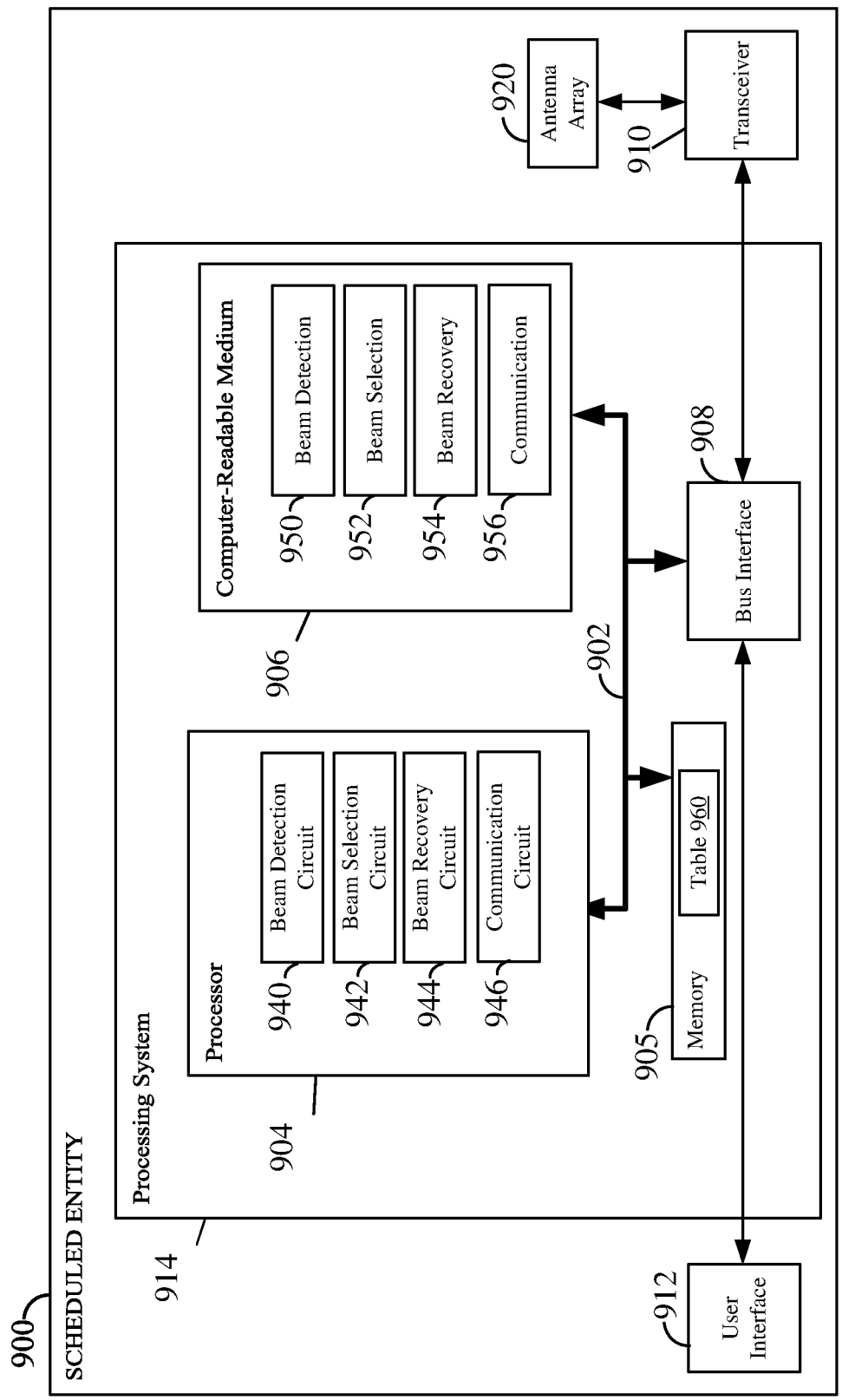
FIG. 9 is a block diagram illustrating an example of a hardware implementation for a scheduled entity employing a processing system according to some aspects of the disclosure.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a UE or scheduled entity as illustrated in any one or more of FIGS. 1, 2, 3, 5A-5G, 7, and/or 12.

The processing system 914 may be substantially the same as the processing system 814 illustrated in FIG. 8, including a bus interface 908, a bus 902, memory 905, a processor 904, and a computer-readable medium 906. Furthermore, the scheduled entity 900 may include a user interface 912, a transceiver 910, and an antenna array 920 substantially similar to those described above in FIG. 8. That is, the processor 904, as utilized in a scheduled entity 900, may be used to implement any one or more of the processes and functions described and illustrated in FIGS. 11-14. In some examples, the scheduled entity may store a mapping or lookup table 960 in the memory 905. The lookup table 960 includes a plurality of beam indexes and the respective resources associated with the beam indexes.

In some aspects of the disclosure, the processor 904 may include various circuitry configured for various functions described in this disclosure. The processor 904 may include a beam detection circuit 940 in cooperation with beam detection instructions 950, configured to perform various beam detection functions. For example, the beam detection circuit 940 may be configured to detect a set of beams from a base station using the antenna array 920, such as by detecting a beam reference signal (BRS) transmitted in a synchronization slot of each beam. The base station may periodically transmit the BRS in each beam. The processor 904 may further include a beam selection circuit 942 in cooperation with beam selection instructions 952, configured to select a beam. For example, the scheduled entity may select a beam by measuring the received power and/or quality associated with each beam in a set of beams, and selecting the beam that corresponds to the highest power and/or signal quality.

The processor 904 may further include a beam recovery circuit 944 in cooperation with beam recovery instructions 954, configured to perform various beam failure recovery functions. For example, the beam recovery circuit 944 may be configured to determine the resources (e.g., time, frequency, and preamble) for transmitting a beam failure recovery request (BFRR), based on a selected beam or index. The scheduled entity may transmit the BFRR using contention-based RACH resources. The processor 904 may further include a communication circuit 946 in cooperation with communication instructions 956, configured to perform various wireless communication functions. For example, the communication circuit 946 may be configured to perform a RACH process including transmitting/receiving a RACH preamble, a RACH response, an RRC connection request, and an RRC connection setup message. The communication circuit 946 may be configured to transmit or receive a BFRR during a RACH procedure.

Figure 10:
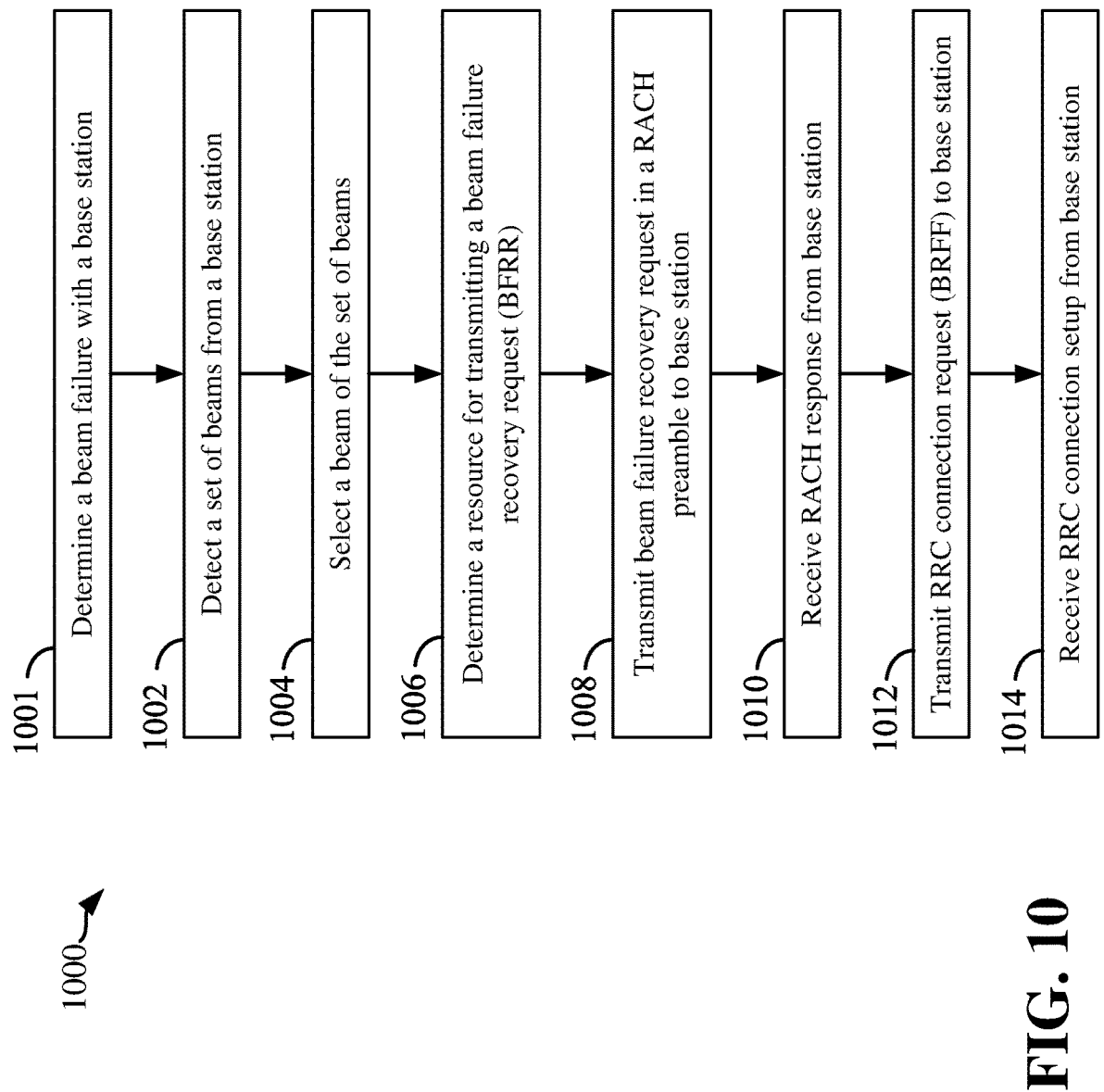
FIG. 10 is a flow chart illustrating a beam failure recovery process operable at a user equipment (UE) according to some aspects of the disclosure.

FIG. 10 is a flow chart illustrating a beam failure recovery process 1000 operable at a UE or scheduled entity according to some aspects of the disclosure. As described below, some or all illustrated features may be omitted in a particular implementation within the scope of the present disclosure, and some illustrated features may not be required for implementation of all embodiments. In some examples, the process 1000 may be carried out by the scheduled entity 900 illustrated in FIG. 9. In some examples, the process 1000 may be carried out by any suitable apparatus or means for carrying out the functions or algorithm described below.

The scheduled entity 900 (e.g., UE) may communicate with a base station or scheduling entity using beamforming similar to the examples illustrated in FIGS. 5A-5G. When the scheduled entity loses its current beam for communicating with the base station, the scheduled entity may perform the beam failure recovery process 1000 to recover. At block 1001, the scheduled entity may utilize its beam detection circuit 940 to determine a beam failure of a current beam with a scheduling entity (e.g., a base station). For example, the scheduled entity may detect the beam failure condition (e.g., beam lost or failed) when the signal strength of the beam is below a certain threshold or not detectable. At block 1002, the scheduled entity may utilize the beam detection circuit 940 to detect a set of beams from the base station, such as by detecting a beam reference signal (BRS) transmitted in a synchronization slot of each beam. For example, referring to FIG. 5E, the scheduled entity may detect the first set of beams 521, 523, 525, 527 by detecting a BRS transmitted in a synchronization slot of each beam 521, 523, 525, 527. The base station may periodically transmit the BRS in each beam.

At block 1004, the scheduled entity may utilize its beam selection circuit 942 to select a beam from the set of beams to replace the current beam to recover from the beam failure condition. For example, the scheduled entity may measure the received power and/or quality associated with each of the first set of beams 521, 523, 525, 527. Then the scheduled entity may select the beam with the highest power and/or best quality. The selected beam may correspond to a beam index known to the base station or scheduling entity. For example, the scheduled entity may store a lookup table 830 including a plurality of beam indexes in the memory 805. In one example, the scheduled entity may select the beam (e.g., beam 523 of FIG. 5F) that has the highest power and/or best quality. The scheduled entity may determine the power and quality based on the BRS of the beam.

At block 1006, the scheduled entity may utilize its beam recovery circuit 944 to determine a resource (e.g., time, frequency, and preamble), sequence, and/or waveform for transmitting a beam failure recovery request (BFRR), based on the selected beam or index. For example, the scheduled entity may determine that the resource includes certain symbol(s), subcarriers, and/or preambles among certain contention-based RACH resources that may be used to communicate a BRFF to the base station. The resource may be the time and frequency resource location (e.g., RACH resources 602) that is used by the scheduled entity to transmit the PRACH. The scheduled entity may use any suitable sequences to transmit on the PRACH. For example, the scheduled entity may use a Zadoff Chu sequence to transmit on the PRACH, and the selected root and cyclic shift of the Zadoff Chu sequence may be considered as parts of waveform. The combination of waveform, sequence, and RACH resources can also be denoted as preambles. In some aspects of the disclosure, the scheduling entity may inform the scheduled entity about these contention-based RACH resources through one or more of a master information block (MIB), a system information block (SIB), minimum system information (MSI), a master system information block (MSIB), remaining minimum system information (RMSI)

block, other system information (OSI), and radio resource control (RRC) signaling. The scheduling entity (e.g., base station, eNB, gNB) may transmit the information periodically, aperiodically, and/or on demand. In some examples, the scheduling entity may provide the information on the PDCCH and/or physical downlink shared channel (DPSCH) dedicated to the UE. In 5G NR, the network may broadcast system information in various system information blocks, for example, SIB1, SIB2, SIB3, etc. SIB1 and SIB2 together may be called RMSI that is the bare minimum of system information that a UE needs to go through a RACH procedure to come into a system. SIB3 plus all other SIBs (excluding SIB2 and SIB2) may be called other system information (OSI).

In one aspect of the disclosure, the scheduled entity may have stored therein or may have access to a mapping or table (e.g., a lookup table 960 of FIG. 9) that indicates a respective resource (e.g., a value or index) to which the beam index corresponds. For example, the UE may determine the beam index and then access a lookup table to determine a resource index or region that corresponds to the determined beam index.

At block 1008, the scheduled entity may transmit, on the determined resource, a BFRR as a RACH preamble (message 1) to the base station. For example, the base station may dedicate one or more preambles for communicating the BFRR. The scheduled entity may utilize its communication circuit 946 and/or transceiver 910 to transmit the RACH preamble (BFRR) via the antenna array 920. The resource used for transmitting the RACH preamble may indicate the purpose of the transmission is to transmit the BFRR. The resource may correspond to an index associated with the selected beam. Therefore, the RACH preamble transmission in effect communicates a BFRR to the scheduling entity. For example, the scheduled entity may utilize the communication circuit 946 and transceiver 910 to transmit the BFRR as a RACH preamble to the base station. In one aspect of the disclosure, the resource for transmitting the BFRR may be included in contention-based RACH resources 602 dedicated to contention-based RACH and BFRR. The base station or scheduling entity may receive the RACH preamble that conveys a BFRR using the selected beam corresponding to the determined resource or beam index.

At block 1010, the scheduled entity may receive a RACH response (message 2) from the base station in response to the RACH preamble (i.e., BFRR). The scheduled entity may utilize the communication circuit 946, transceiver 910, and antenna array 920 to receive the RACH response. In some aspects of the disclosure, the base station may query the scheduled entity in the RACH response whether the scheduled entity is performing the RACH procedure to communicate or transmit a BFRR. For example, the RACH response may include a flag or field (e.g., one bit field) that may be set to a predetermined value to indicate the inquiry.

At block 1012, the scheduled entity may utilize the communication circuit 946 and transceiver 910 to transmit an RRC connection request (message 3) to the base station. In one aspect of the disclosure, the scheduled entity may use the RRC connection request to inform the base station that the current RACH procedure is being performed to transmit a BFRR. That is, the RRC connection request may be configured to indicate that the RACH preamble is transmitted for the purpose of conveying the BFRR. For example, the RRC connection request may include a flag or field (e.g., one bit field) that may be set to a predetermined value to indicate that the RACH procedure is being performed to transmit a BFRR. In one aspect of the disclosure, the scheduled entity may indicate its beam recovery intention in message 3 only if the base station queries the UE's intention in the RACH response (message 2).

At block 1014, the scheduled entity receives an RRC connection setup message (e.g., message 4) from the base station. In some examples, the base station may allocate some beam refinement resources during or after the RRC connection setup message. In some examples, the base station may transmit a beam tracking or refinement signal (e.g., a BRRS) to the scheduled entity based on the request during or after the RRC connection setup message. The scheduled entity may perform beam refinement based on the processes as described above in relation to FIGS. 5A-5G or other beam recovery processes.

Figure 11:
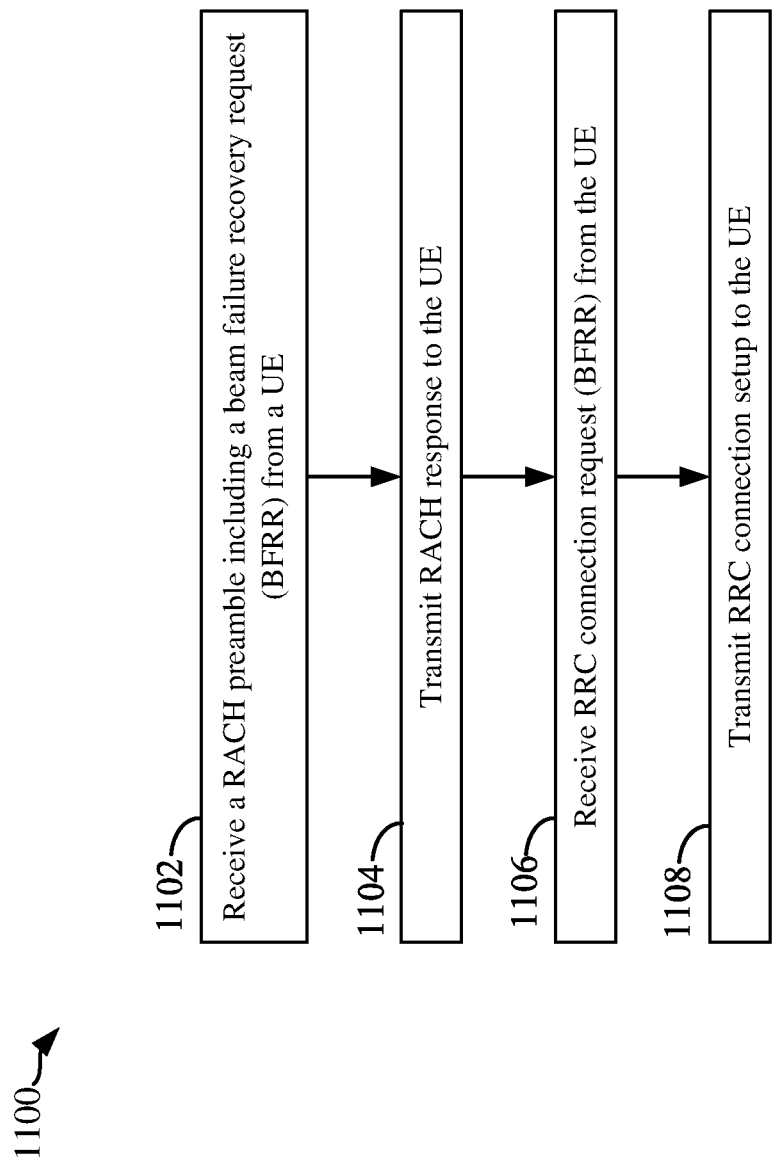
FIG. 11 is a flow chart illustrating a beam failure recovery process operable at a base station according to some aspects of the disclosure.

FIG. 11 is a flow chart illustrating a beam failure recovery process 1100 operable at a scheduling entity according to some aspects of the disclosure. As described below, some or all illustrated features may be omitted in a particular implementation within the scope of the present disclosure, and some illustrated features may not be required for implementation of all embodiments. In some examples, the process 1100 may be carried out by the scheduling entity 800 illustrated in FIG. 8. In some examples, the process 1100 may be carried out by any suitable apparatus or means for carrying out the beam failure recovery functions or algorithm described below.

In some aspects of the disclosure, the scheduling entity 800 can dedicate a set of RACH resources (e.g., time, frequency, and/or preambles) for transmitting contention-based RACH messages and a beam failure recovery request (BFRR) similar to those described above in relation to FIGS. 6 and 10.

At block 1102, the scheduling entity may use the communication circuit 842, transceiver 810, and antenna array 820 (see FIG. 8) to receive a RACH preamble from a UE or scheduled entity. The RACH preamble may be received on communication resources that are dedicated to both contention-based RACH and BFRR (e.g., PRACH 602 of FIG. 6). The use of particular resources for receiving the RACH preamble indicates a beam index corresponding to a beam from which the RACH preamble is received. That is, the scheduling entity may receive the BFRR on a beam corresponding to the beam index or resources that are associated with the contention-based RACH resources.

At block 1104, in response to the RACH preamble, the scheduling entity may transmit a RACH response (message 2) to the UE. The scheduling entity may use its RACH circuit 844 to determine the RACH response based on the received RACH preamble. The scheduling entity may further use the communication circuit 842 and transceiver 810/antenna array 820 to transmit the RACH response to the UE. In some aspects of the disclosure, the scheduling entity may query the UE in the RACH response whether the UE is performing the RACH procedure for the purpose of transmitting or conveying a BFRR. For example, the RACH response may include a flag or field (e.g., one bit field) that may be set to a predetermined value to indicate the inquiry.

At block 1106, the scheduling entity may use the communication circuit 842 and transceiver 810/antenna array 820 to receive an RRC connection request (message 3) from the UE. In one aspect of the disclosure, the RRC connection request may indicate that the UE's intention for performing the RACH procedure is for the purpose of beam failure recovery. That is, the RRC connection request may indicate that the RACH preamble transmitted earlier includes a BFRR. For example, the RRC connection request may include a flag or field (e.g., one bit field) that is set to a predetermined value to indicate that the RACH procedure is performed to send or communicate a BFRR. In one aspect of the disclosure, the UE informs its beam recovery intention in performing the RACH procedure only if the scheduling entity queries the UE's intention in the RACH response (message 2), at block 1104.

At block 1108, the scheduling entity may transmit an RRC connection setup message (message 4) to the UE. The scheduling entity may use the RACH circuit 844 to determine the RRC connection setup message, and use the communication circuit 842 and transceiver 810/antenna array 820 to transmit the RRC connection setup message to the UE. In some examples, the scheduling entity may utilize its beamforming circuit 846 to allocate beam refinement resources during or after the RRC connection setup message. In some examples, the scheduling entity may use the beamforming circuit 846 to transmit a beam tracking or refinement signal (e.g., a BRRS) to the UE during or after the RRC connection setup message. In other examples, the scheduling entity may perform other beamforming functions after the RACH procedure.

Figure 12:
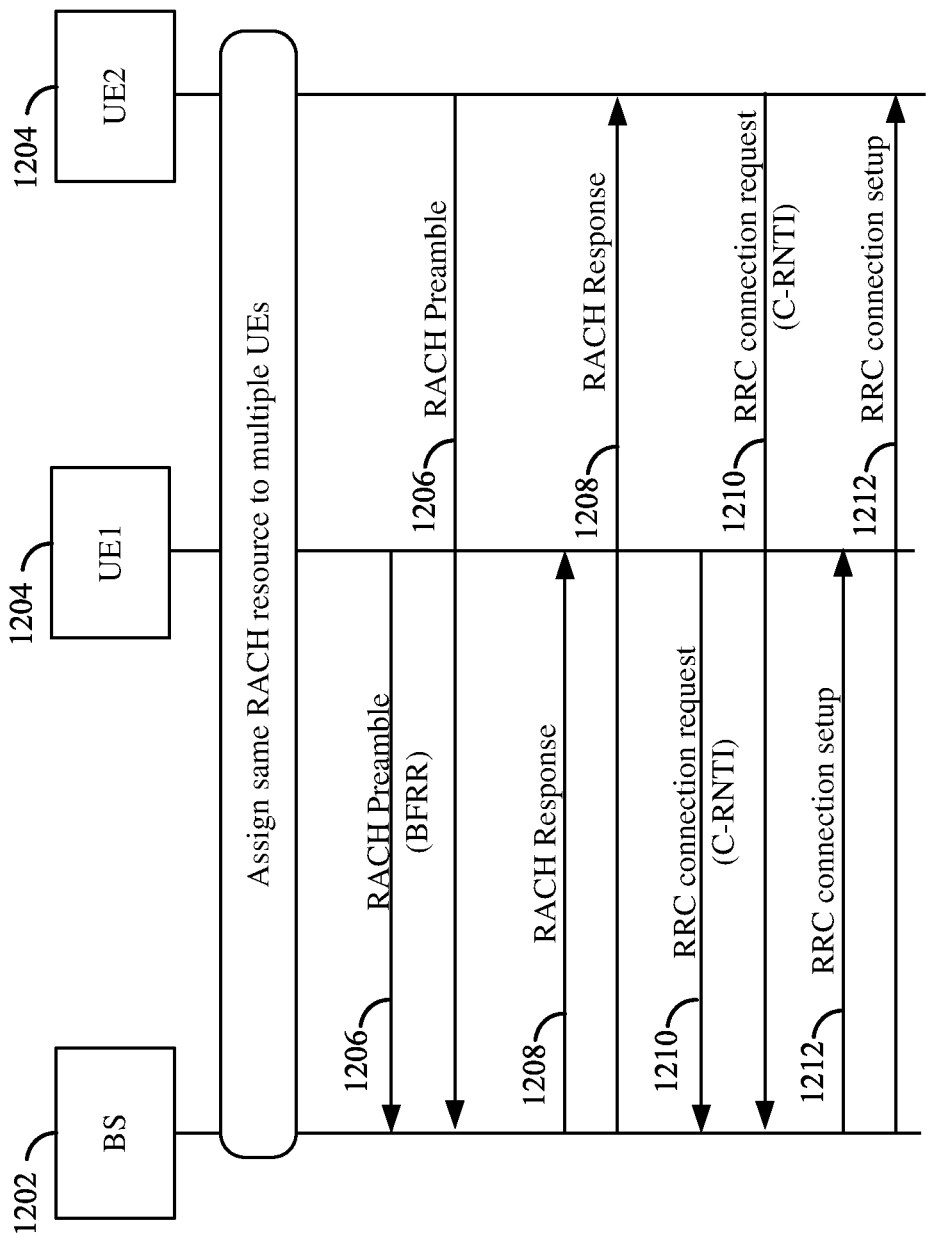
FIG. 12 is a diagram illustrating signaling for communicating a beam failure recovery request (BFRR) using RACH resources commonly assigned to multiple UEs according to some aspects of the disclosure.

FIG. 12 is a diagram illustrating the signaling for transmitting a beam failure recovery request (BFRR) using a RACH resource commonly assigned to multiple UEs according to some aspects of the disclosure. A base station (BS) 1202 or scheduling entity can assign the same RACH resource (e.g., a RACH preamble and/or time-frequency resources) to multiple UEs 1204 or scheduled entities such that overhead in resource usage may be reduced. The base station 1202 may be any of the base stations or scheduling entities illustrated in FIGS. 1-3, 5A-5G, 7, and/or 12. The UEs 1204 (e.g., UE1 and UE2) may be any of the UEs or scheduled entities illustrated in FIGS. 1-3, 5A-5G, 7, and/or 12.

Referring to FIG. 12, a first UE 1204 (UE1) may transmit a first RACH preamble 1206 (message 1) to the base station 1202 using the contention-based RACH resource 602 (see FIG. 6) that is assigned or allocated to multiple UEs. In some examples, UE1 may transmit the first RACH preamble 1206 to communicate a BFRR or a scheduling request. A second UE 1204 (UE2) may transmit the same RACH preamble 1206 to the base station using the same RACH resource. In this case, the base station 1202 needs to determine which of the UEs (UE1 or UE2) transmits the RACH preamble 1206 because the same RACH resource (e.g., RACH preamble and/or time-frequency resources) is assigned to multiple UEs 1204. In this case, UE1 and UE2 may not be completely "new" to the base station 1202 if these UEs 1204 are already within or camped on the cell associated with the base station. In that case, each of the UEs 1204 may already have a C-RNTI or the like previously assigned by the base station, and the base station 1202 does not assign a temporary C-RNTI in a RACH response.

In a RACH response 1208 (message 2), the base station 1202 may request the UEs 1204 to reveal their respective C-RNTIs in their first UL message. For example, the UEs 1204 may transmit an RRC connection request message (message 3) 1210 to the base station 1202 including their respective C-RNTIs. Then, the base station 1202 may confirm the UE's C-RNTIs in a DL message. For example, the base station may transmit an RRC connection setup message 1212 (message 4) to each UE with its corresponding C-RNTI. If the C-RNTIs match, the base station and UE can complete the beam failure recovery process.

In one example, if the base station determines that the received C-RNTI matches a C-RNTI of a UE that may use the RACH procedure for conveying a BFRR, the base station may transmit a beam refinement signal through message 4 of a RACH procedure. In some examples, the base station may transmit a beam refinement signal or CSI-RS through message 2. The base station may allocate certain RACH time-frequency resources and preambles for conveying both regular RACH message (intended for initial access/handover, etc.) and BFRR. When the base station receives a RACH preamble (message 1) through these resources, the base station may assume that the RACH message was transmitted to convey BFRR. Then the base station may transmit a beam RS or CSI-RS to the UE in message 2, assuming that the UE may need these beam refinement signals as early as possible. In this case, the base station prioritize beam failure recovery over other signals (e.g., RACH) in these resource regions. The refined beams may be determined based on the beam that the UE selected to transmit BFRR. If the received C-RNTI does not match a C-RNTI of a UE that may transmit BFRR using a RACH procedure, in one example, the base station can abort the RACH procedure because this UE was not supposed to transmit the BRFF through that preamble. In this case, the base station may not transmit message 4 (i.e., response to RRC connection request). In other words, the base station does not transmit a message 4 (e.g., PDCCH) scrambled by the C-RNTI. If the UE does not receive message 4/PDCCH scrambled by the C-RNTI that it sent earlier, the UE aborts the RACH procedure at the end of, for example, a ContentionResolutionTimer.

In another example, the base station may continue the RACH procedure even when the received C-RNTI does not match a C-RNTI of a UE that may transmit BFRR using a RACH procedure because the UE could have tried its assigned preamble several times but that did not go through for various reasons. For example, if the UE used the "wrong" preamble, the base station may still send a beam refinement/tracking signal through message 4 in a RACH procedure.

In some aspects of the disclosure, the RACH procedures described above in relation to FIGS. 10-12 may be adapted or used by a UE to transmit a scheduling request to the base station.

FIG. 13 is a flow chart illustrating a beam failure recovery process 1300 operable at a scheduling entity according to some aspects of the disclosure. As described below, some or all illustrated features may be omitted in a particular implementation within the scope of the present disclosure, and some illustrated features may not be required for implementation of all embodiments. In some examples, the process 1300 may be carried out by the scheduling entity 800 illustrated in FIG. 8. In some examples, the process 1300 may be carried out by any suitable apparatus or means for carrying out the beam failure recovery functions or algorithm described below.

At block 1302, a scheduling entity may use the RACH circuit 844 to assign a RACH resource (e.g., RACH preamble and/or time-frequency resources) to a plurality of scheduled entities including a UE for conveying or communicating a beam failure recovery request (BFRR). In one example, the scheduled entities may be the UEs 1204 of FIG. 12. The scheduling entity may use the communication circuit 842 and transceiver 810 to transmit resource allocation information of the RACH resource to the plurality of scheduled entities in, for example, a PSS, an SSS, a PBCH, a RMSI, an other system information (OSI), a PDCCH, a RRC message, or a handover message. The resource may include a predetermined RACH preamble and/or time-frequency resource.

At block 1304, the scheduling entity may use the communication circuit 842 and transceiver 810 to receive, from the UE, the BFRR in a RACH procedure utilizing the assigned RACH resource. For example, the RACH procedure may be the same as the RACH procedure described above in relation to FIG. 12. At block 1306, the scheduling entity may use the RACH circuit 844 to request, in the RACH procedure, the UE to provide a C-RNTI or UE ID. In this example, the scheduling entity does not assign a temporary C-RNTI to the UE in the RACH procedure because the UE is already known to the network. At block 1308, the scheduling entity may use the communication circuit 842 to receive, in the RACH procedure, the C-RNTI from the UE. Using the above processes described in relation to FIGS. 12 and 13, the scheduling entity can reduce overhead in RACH resource usage by assigning the same contention-based RACH resource to multiple UEs that may use a contention-based RACH procedure to transmit a BFRR.

FIG. 14 is a flow chart illustrating a beam failure recovery process 1400 operable at a UE or scheduled entity according to some aspects of the disclosure. As described below, some or all illustrated features may be omitted in a particular implementation within the scope of the present disclosure, and some illustrated features may not be required for implementation of all embodiments. In some examples, the process 1400 may be carried out by the scheduled entity 900 illustrated in FIG. 9. In some examples, the process 1400 may be carried out by any suitable apparatus or means for carrying out the beam failure recovery functions or algorithm described below.

At block 1402, the UE may use its communication circuit 946 to receive, from a scheduling entity, an assignment of a RACH resource that is assigned to a plurality of scheduled entities including the UE for conveying or communicating a beam failure recovery request (BFRR). For example, the plurality of scheduled entities may include UE1 and UE2 of FIG. 12. The UE may receive allocation information of the RACH resource in a PSS, an SSS, a PBCH, an RMSI, an OSI, a PDCCH, an RRC message, or a handover message. The RACH resource may include a RACH preamble and/or time-frequency resources.

The UE may use its beam detection circuit 940 to determine that its current beam is lost or failing. At block 1404, the UE may use its beam recovery circuit 944 and communication circuit 946 to transmit, to the scheduling entity, a BFRR in a RACH procedure utilizing the assigned RACH resource. For example, the RACH procedure may be the same as the RACH procedure described above in relation to FIGS. 11 and 12.

At block 1406, the UE may use its communication circuit 946 to receive a request from the scheduling entity to provide a C-RNTI or UE ID. In this example, the base station does not assign a temporary C-RNTI to the UE because the UE may be known to the network. At block 1408, the UE may use the communication circuit 946 to transmit, in the RACH procedure, the C-RNTI to the scheduling entity. In this process 1400, the UE uses a contention-based RACH procedure and contention-based RACH resources assigned to multiple UEs to transmit the BFRR such that resource usage or overhead may be reduced.

In one configuration, the apparatus 800 and/or 900 for wireless communication includes means for performing beam failure recovery in a RACH procedure as described above in relation to FIGS. 10-14. In one aspect, the aforementioned means may be the processor(s) 804/904 shown in FIG. 8/9 configured to perform the functions recited by the aforementioned means. In another aspect, the aforementioned means may be a circuit or any apparatus configured to perform the functions recited by the aforementioned means.

Of course, in the above examples, the circuitry included in the processor 804/904 is merely provided as an example, and other means for carrying out the described functions may be included within various aspects of the present disclosure, including but not limited to the instructions stored in the computer-readable storage medium 806/904, or any other suitable apparatus or means described in any one of the FIGS. 1, 2, 3, 5A-5G, 7, and/or 12, and utilizing, for example, the processes and/or algorithms described herein in relation to FIGS. 10-14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communications at a user equipment (UE), comprising:
    determining a beam failure of a current beam with a scheduling entity;
    transmitting a random access channel (RACH) preamble in response to the determination of the beam failure;
    receiving a RACH response from the scheduling entity; and
    transmitting a radio resource control (RRC) connection request to the scheduling entity, wherein the RRC connection request indicates that the RACH preamble comprises a beam failure recovery request.

2. The method of claim 1, further comprising:
    detecting a set of beams from the scheduling entity;
    selecting a beam from the set of beams to replace the current beam to recover from the beam failure;
    determining at least one of a RACH resource or a waveform corresponding to the selected beam; and
    transmitting the RACH preamble utilizing the at least one of the RACH resource or the waveform.

3. The method of claim 1, wherein the RACH response queries the UE whether a RACH procedure is being performed to transmit the beam failure recovery request.

4. The method of claim 3, wherein only if the RACH response queries the UE whether the RACH procedure is performed to transmit the beam failure recovery request, the RRC connection request indicates that the RACH procedure is performed to transmit the beam failure recovery request.

5. The method of claim 1, further comprising:
    receiving, from the scheduling entity, a beam refinement reference signal (BRRS) or a channel state information reference signal (CSI-RS); and
    selecting a refined beam based on the BRRS or the CSI-RS.

6. The method of claim 1, further comprising:
    receiving allocation information of contention-based RACH resources through at least one of a master information block (MIB), a system information block (SIB), a master system information block (MSIB), a remaining minimum system information (RMSI), an other SIB (OSIB), or radio resource control (RRC) signaling.

7. The method of claim 1, further comprising:
    receiving allocation information of contention-based RACH resources through a physical downlink control channel (PDCCH) or a physical downlink shared channel (PDSCH), wherein at least a portion of the contention-based RACH resources is allocated to transmission of the beam failure recovery request.

8. A method of beam failure recovery operable at a scheduling entity, comprising:
    receiving a random access channel (RACH) preamble in a RACH procedure from a user equipment (UE);
    transmitting a RACH response to the UE; and
    receiving a radio resource control (RRC) connection request from the UE, wherein the RRC connection request indicates that the RACH preamble comprises a beam failure recovery request.

9. The method of claim 8, wherein the RACH response queries the UE whether the RACH procedure is performed to transmit the beam failure recovery request.

10. The method of claim 9, wherein only if the RACH response queries the UE whether the RACH procedure is performed to transmit the beam failure recovery request, the RRC connection request indicates that the RACH procedure is performed to transmit the beam failure recovery request.

11. The method of claim 8, further comprising:
    receiving, from the UE, a request to transmit a beam refinement reference signal (BRRS) or a channel state information reference signal (CSI-RS).

12. The method of claim 11, further comprising:
    transmitting the BRRS or the CSI-RS in each of a plurality of refined beams.

13. The method of claim 8, further comprising:
    transmitting allocation information of contention-based RACH resources through at least one of a master information block (MIB), a system information block (SIB), a master system information block (MSIB), a remaining minimum system information block (RMSI), an other SIB (OSIB), or radio resource control (RRC) signaling.

14. The method of claim 8, further comprising:
    transmitting allocation information of contention-based RACH resources through a physical downlink control channel (PDCCH) or a physical downlink shared channel (PDSCH), wherein at least a portion of the contention-based RACH resources is allocated to transmission of the beam failure recovery request.

15. The method of claim 8, further comprising:
    transmitting an RRC connection setup message to the UE, the RRC connection setup message comprising allocation information of beam refinement resources.

16. A method of beam failure recovery operable at a scheduling entity, comprising:
assigning a random access channel (RACH) resource to a plurality of scheduled entities including a user equipment (UE) for conveying a beam failure recovery request (BFRR); and
receiving, from the UE, the BFRR in a RACH procedure utilizing the assigned RACH resource;
receiving, in the RACH procedure, a cell radio network temporary identity (C-RNTI) from the UE; and
confirming the C-RNTI received from the UE corresponds to a C-RNTI stored in the scheduling entity.

17. The method of claim 16, further comprising:
transmitting allocation information of the RACH resource to the plurality of scheduled entities utilizing at least one of:
a primary synchronization signal (PSS);
a secondary synchronization signal (SSS);
a physical broadcast channel (PBCH);
a remaining minimum system information (RMSI);
an other system information (OSI);
a physical downlink control channel (PDCCH);
a radio resource control (RRC) message; or
a handover message.

18. The method of claim 16, further comprising:
forgoing, in the RACH procedure, transmitting a temporary C-RNTI to the UE.

19. The method of claim 16, wherein the RACH resource comprises at least one of:
a RACH preamble; or
a time-frequency resource.

20. The method of claim 16, wherein the RACH procedure is a contention-based random access procedure.

21. A method of beam failure recovery operable at a user equipment (UE), comprising:
receiving, from a scheduling entity, an assignment of a random access channel (RACH) resource that is assigned to a plurality of scheduled entities including the UE for conveying a beam failure recovery request (BFRR); and
transmitting, to the scheduling entity, the BFRR in a RACH procedure utilizing the assigned RACH resource;
transmitting, in the RACH procedure, a cell radio network temporary identity (C-RNTI) to the scheduling entity; and
completing a beam failure recovery with the scheduling entity upon confirmation by the scheduling entity that the transmitted C-RNTI corresponds to a C-RNTI stored in the scheduling entity.

22. The method of claim 21, further comprising:
receiving allocation information of the RACH resource from the scheduling entity utilizing at least one of:
a primary synchronization signal (PSS);
a secondary synchronization signal (SSS);
a physical broadcast channel (PBCH);
a remaining minimum system information (RMSI);
an other system information (OSI);
a physical downlink control channel (PDCCH);
a radio resource control (RRC) message; or
a handover message.

23. The method of claim 21, further comprising:
forgoing, in the RACH procedure, receiving a temporary C-RNTI from the scheduling entity.

24. The method of claim 21, wherein the RACH resource comprises at least one of:
a RACH preamble; or
a time-frequency resource.

25. The method of claim 21, wherein the RACH procedure is a contention-based random access procedure.

* * * * *